United States Patent [19]

Matsuzaki et al.

[11] Patent Number: 4,743,931
[45] Date of Patent: May 10, 1988

[54] APPARATUS FOR DELIVERING DISTANCE INFORMATION OF CAMERA

[75] Inventors: Minoru Matsuzaki, Hachioji; Youji Watanabe, Sagamihara; Junichi Itoh, Hachioji; Masato Miyazawa, Nagano; Toru Komatsu, Okaya, all of Japan

[73] Assignee: Olympus Optical Company, Ltd., Tokyo, Japan

[21] Appl. No.: 934,841

[22] Filed: Nov. 25, 1986

[30] Foreign Application Priority Data

Dec. 5, 1985 [JP] Japan .................................. 60-275251
Jun. 30, 1986 [JP] Japan .................................. 61-154880
Jul. 1, 1986 [JP] Japan .................................. 61-154622

[51] Int. Cl.$^4$ .............................................. G03B 3/00
[52] U.S. Cl. .................................... 354/400; 354/286; 354/402
[58] Field of Search ........................ 354/400, 402, 286

[56] References Cited

U.S. PATENT DOCUMENTS

| 4,238,143 | 12/1980 | Shenk | 354/400 |
|---|---|---|---|
| 4,239,354 | 12/1980 | Shenk | 354/400 |
| 4,348,089 | 9/1982 | Shenk | 354/400 |
| 4,508,443 | 4/1985 | Matsuzaki et al. | 354/286 |
| 4,537,487 | 8/1985 | Taniguchi et al. | 354/400 |
| 4,557,557 | 12/1985 | Shinoda | 354/400 |
| 4,613,224 | 9/1986 | Ogasawara | 354/286 |

FOREIGN PATENT DOCUMENTS 0067650 6/1975 Japan .

Primary Examiner—Russell E. Adams
Attorney, Agent, or Firm—Louis Weinstein

[57] ABSTRACT

Apparatus for delivering distance information of a camera includes counter means which counts a relative distance corresponding to a movement of a taking lens. The counter means is reset when the taking lens reaches a reference position located at infinity. Using stored data (absolute distance factors) which is specific to a taking lens and the count in the counter means, an absolute distance is derived.

54 Claims, 27 Drawing Sheets

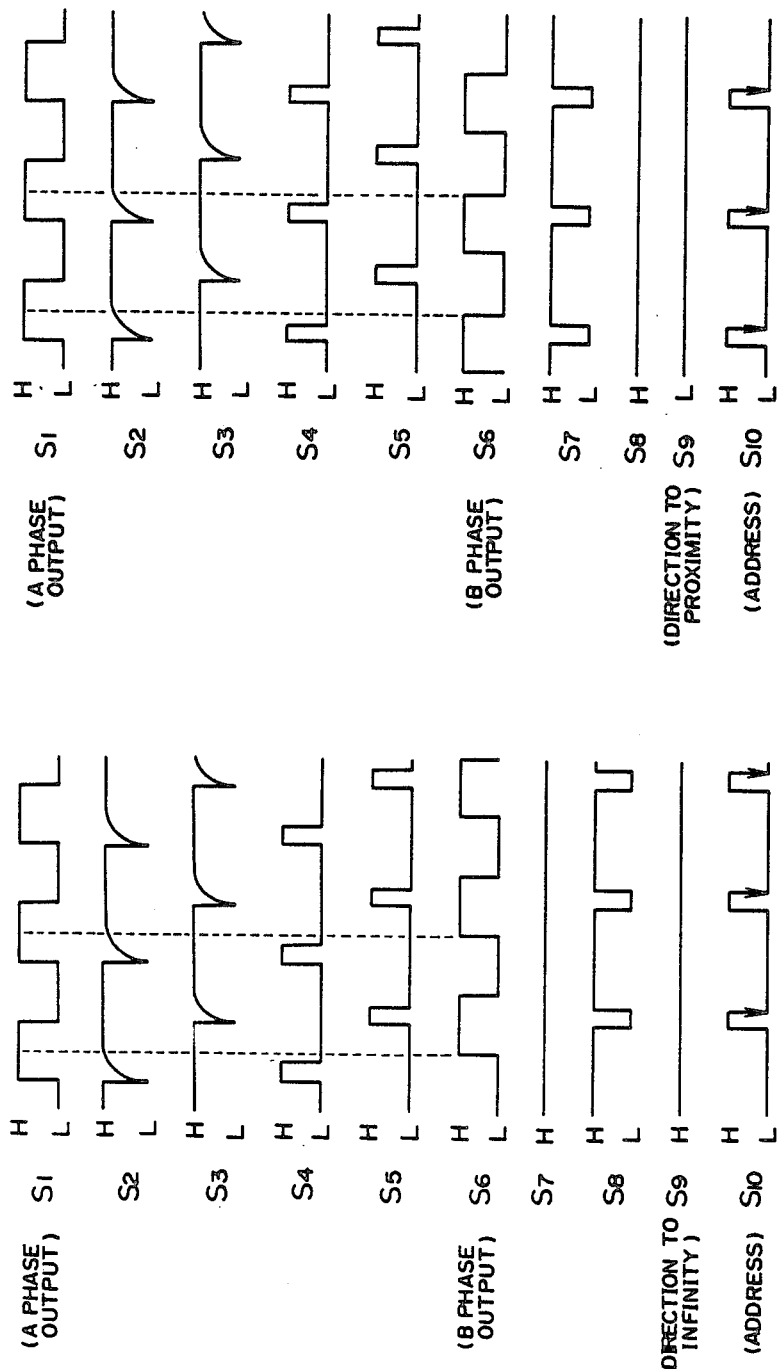

APPARATUS FOR DELIVERING DISTANCE INFORMATION OF CAMERA

BACKGROUND OF THE INVENTION

The invention relates to an apparatus for delivering distance information for a camera, and more particularly, to such apparatus which is capable of deriving the absolute value of distance information for the purpose of driving an automatic focusing device.

As is recognized, an output relating to a distance information of a lens includes both an absolute magnitude and a relative magnitude of distance information. An absolute magnitude of distance information as used in an automatic focusing device refers to a signal which corresponds to the distance itself while a relative magnitude of distance information refers to an offset as referenced to a present distance. Distance information representing a relative distance can be delivered through comb-shaped electrodes alone, for example, which may be advantageously employed in an apparatus for delivering distance information of an interchangeable lens to simplify its construction. However, it is more convenient to use distance information representing an absolute magnitude in a single lens reflex camera which operates as a system camera.

Several means are known for deriving distance information representing an absolute magnitude, including (1) the use of an absolute distance encoder mounted in an interchangeable lens for developing a 4 bit, digital signal of Gray code (see Japanese Laid-Open Patent Application No. 67,650/1975) and (2) the use of a member which is mechanically interlocked with a distance ring of an interchangeable lens and the movement of which is detected by employing a permanent magnet and a magnetoelectric transducer element (see Japanese Laid-Open Patent Application No. 108,828/1985). In either technique, an absolute magnitude of distance is derived in terms of a movement of a lens distance ring converted into an output, that is, by utilizing a member which is directly interlocked with the distance ring.

However, either technique mentioned above requires the provision of an absolute distance encoder or detecting transducer element on every interchangeable lens barrel, and such encoder or element occupies a relatively large space, resulting in an increased size and cost of such lens barrel, which is unfavorable to a user when attempting a systematized use.

The present applicant has previously proposed an apparatus for calculating an absolute distance in which a pulse generator is mounted within an interchangeable lens barrel to develop an address signal which is counted by a CPU (arithmetic and logical unit) also located within the lens for enabling a look-up of a distance code table (see Japanese Patent Application No. 134,800/1985). This apparatus requires a memory for the distance code table.

SUMMARY OF THE INVENTION

It is a principal object of the invention to provide an apparatus for delivering the distance information of a camera which is adapted for constructing a systematized camera by allowing a count output corresponding to a relative distance to be calculated in a simple manner and which achieves a good accuracy for an absolute magnitude of distance.

It is another object of the invention to provide an apparatus for delivering the distance information of a camera which increases the probability to enable a distance measurement when an object being photographed is under a low brightness and auxiliary illumination is employed, through a sophisticated use of distance information representing an absolute magnitude.

It is a further object of the invention to provide an apparatus for delivering the distance information of a camera which can be preferably used with AF camera of a interchangeable lens type for an object being photographed which exhibits a low contrast.

According to the invention, a count output corresponding to a relative distance is calculated according to a simple formula to derive an absolute magnitude of distance with a high accuracy, thus allowing such arrangement to be employed in a system camera.

According to the invention, when a distance measurement is made by utilizing auxiliary illumination, distance information representing an absolute magnitude may be utilized to shift a taking lens to a position where the auxiliary illumination is effective, thus increasing the probability of enabling a distance measurement. In this manner, a difficulty experienced in the prior art for such situation has been eliminated.

Additionally, where an object being photographed exhibits a low contrast, which disables a distance measurement, a normal focal position, which varies from taking lens to taking lens, is calculated in accordance with the invention, and a taking lens is moved to such position where the release is actuated. In this manner, the arrangement is preferred for use in an AF camera of interchangeable lens type, preventing a photographing chance from being missed while assuring a picture in good focus.

BRIEF DESCRIPTION OF THE DRAWINGS

FIGS. 17 and 18 are series of timing charts illustrating the waveforms of various signals appearing in the circuit of FIG. 14 when a motor rotates in the forward and the reverse direction, respectively;

DETAILED DESCRIPTION OF PREFERRED EMBODIMENTS

Figure 1:
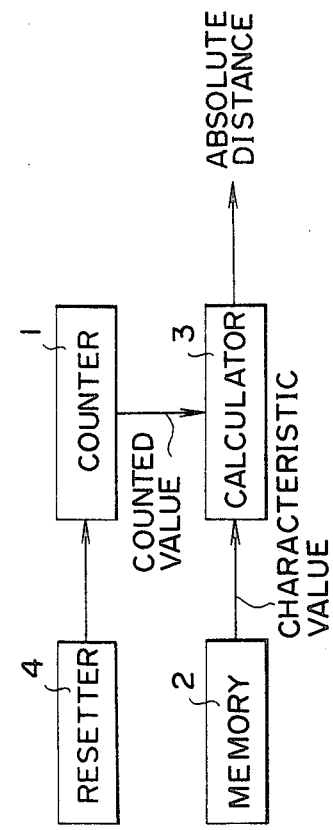
FIG. 1 is a block diagram illustrating a fundamental arrangement of an apparatus for delivering distance information according to the invention.

Before describing several embodiments of the invention, the fundamental construction and the function of the invention will be described briefly. Referring to FIG. 1, an apparatus for delivering the distance information of a camera according to the invention includes counter means 1 which counts a relative distance in accordance with the movement of a taking lens, and also includes memory means 2 which stores data associated with a particular taking lens which is required to convert the count from the counter means 1 into a corresponding absolute distance. The count from the counter means 1 and the specific data stored in the memory means 2 are fed to calculator means 3 which calculates an absolute distance. When a distance ring reaches a reference position, the countier means 1 is reset by reset means 4.

An embodiment of the invention as applied to a camera utilizing interchangeable lens and having an automatic focusing (hereafter abbreviated as AF) fuction will be described.

Figure 2:
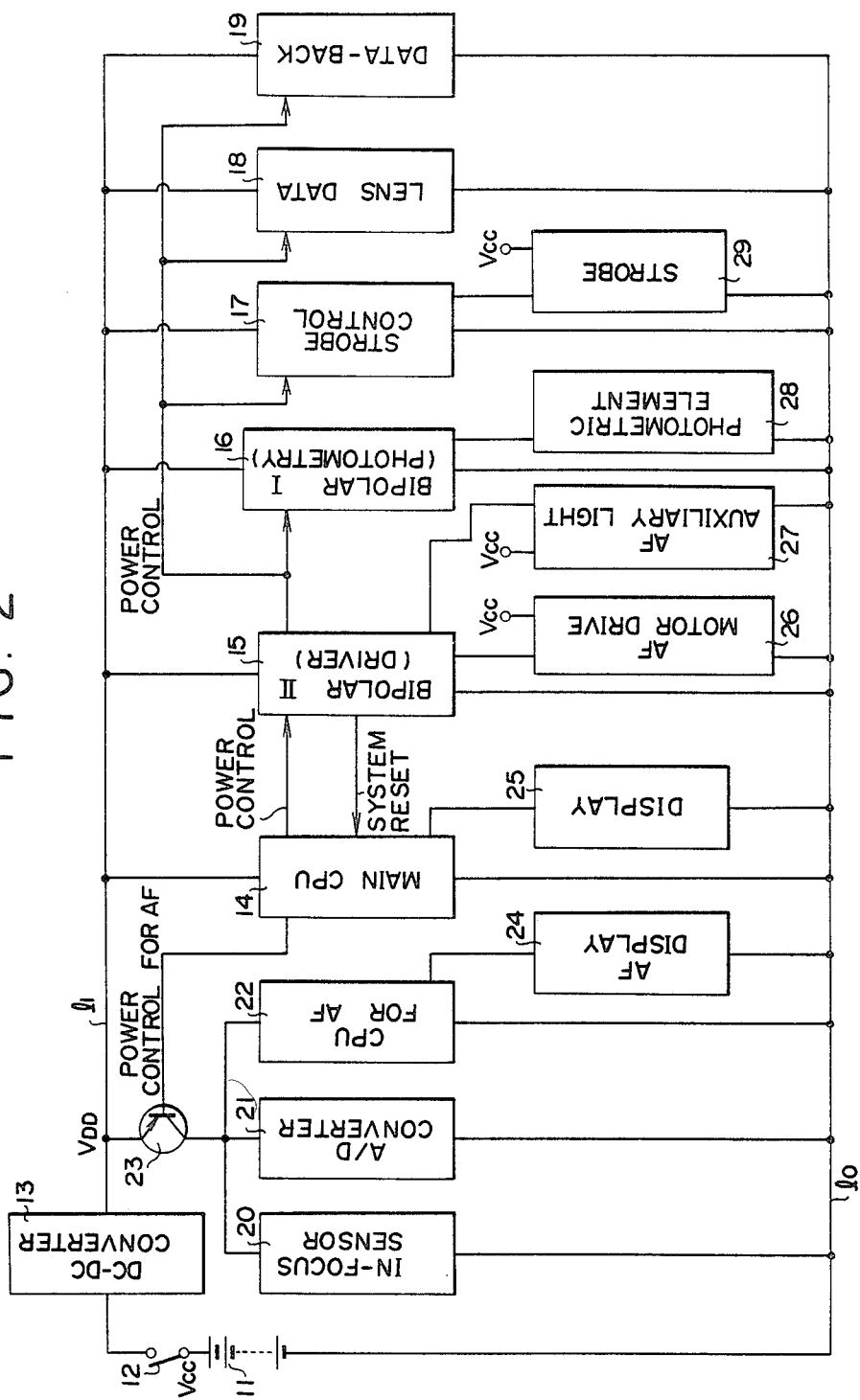
FIG. 2 a block diagram of an electrical circuit which essentially comprises a power supply for a camera system to which invention may be employed.

FIG. 2 is a block diagram of an entire camera system incorporating the invention, principally illustrating the power supply. A voltage source formed by a battery 11 supplies a voltage Vcc which is boosted by DC/DC converter 13 when a power switch 12 is closed, thus establishing a constant voltage $V_{DD}$ across a pair of buses $l_O$, $l_1$. Connected across the buses $l_O$, $l_1$ are a main CPU 14, a bipolar II circuit 15, a bipolar I circuit 16, an electronic flash strobe control circuit 17, a lens data circuit 18 and a data-back circuit 19. The power supply to the bipolar II circuit 15 is controlled by a signal from a power control circuit within the main CPU while the power supply to other circuits including components from the bipolar I circuit 16 to the data-back circuit 19 is controlled by a power control signal from the bipolar II circuit 15.

An AF block comprises an in-focus sensor 20, A/D converter 21 and an AF CPU 22, and is connected across the buses $l_O$, $l_1$ through a power controlling transistor 23. The power supply to the AF block is controlled by turning the transistor 23 on and off in response to a signal from the AF power control circuit within the main CPU 14. The purpose of the AF CPU 22 is to perform a calculation in accordance with an AF algorithm, and has an AF display 24 connected thereto which indicates an in-focus or out-of-focus condition. The main CPU 14 controls the entire sequence including a winding, rewind and exposure sequence, and has a display 25 connected thereto which indicates various conditions other than the in-focus condition. The bipolar II circuit 15 includes various drivers required in the individual sequences of a camera, including a winding and rewind motor control, lens drive and shutter control, and has an AF motor drive circuit 26 and an AF auxiliary light circuit 27 connected thereto. The bipolar I circuit 16 essentially performs a photometry and includes a photometric element 28. The electronic flash control circuit 17 controls the illumination of an electronic flash (strobe) 29 which is either internally housed therein or externally connected thereto. The lens data circuit 18 stores lens data which is specific to each interchangeable lens and which is required in the AF, photometry and other camera control. Data in the lens data circuit 18 which is necessary to the AF function includes a lens variable magnification factor (zoom factor), macro identification signal, absolute distance factors a, b, a power focusing duty cycle, an AF accuracy threshold ETh, the direction of lens movement, an open-F value and the like.

The bipolar II circuit 15 monitors the supply voltage $V_{DD}$, and delivers a system reset signal to the main CPU 14 if the supply voltage is less than a given voltage, thus ceasing delivery of power from the power supply to components ranging from the bipolar II circuit 15 to the data-back circuit 19 as well as power from the power supply to the AF block including the in-focus sensor 20, A/D converter 21 and the AF CPU 22. However, it is to be noted that the power supply to the main CPU 14 is maintained if the supply voltage is less than the given voltage.

Figure 3:
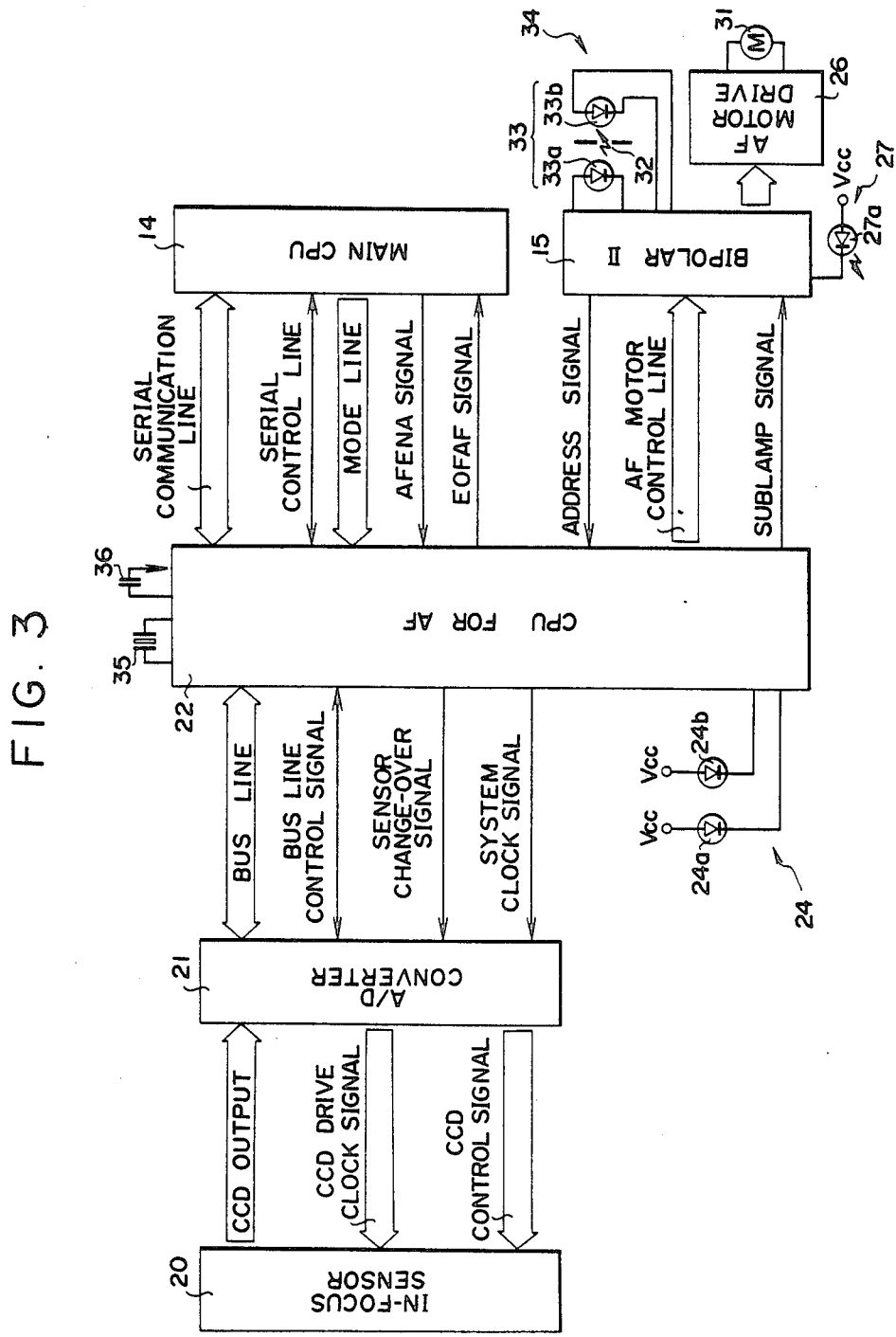
FIG. 3 is a block diagram illustrating the transmission of signals to and from an AF block shown in FIG. 2.

FIG. 3 illustrates the transmission of signals to and from the AF block. Data is transmitted between AF CPU 22 and the main CPU 14 through a serial communication line, with the direction of communication being controlled by serial control line. Data subject to such communication includes the specific lens data stored in the lens data circuit 18 and distance information representing an absolute magnitude. The main CPU 14 also transmits data indicating the mode of a camera (AF single mode/AF sequence mode/power focusing (hereafter abbreviated as PF) mode/other modes), as decoded, to the AF CPU 22 through a mode line. An AFENA (AF enable) signal, which controls the start and the stop of AF and PF mode, is transmitted from the main CPU 14 to the AF CPU 22. An EOFAF (end-of-AF) signal is transmitted from the AF CPU 22 to the main CPU 14, and is produced upon completion of its operation in the AF or PF mode, thus allowing a transfer to an exposure sequence.

The bipolar II circuit 15 decodes a signal on an AF motor control line from the AF CPU 22 for driving the AF motor drive circuit 26. When an AF motor (lens drive motor) 31 rotates in response to an output from the AF motor drive circuit 26, slits 32 which are formed in a rotatable member of a lens barrel at equal intervals rotate, whereby a photo-interrupter 33, comprising a light emitter 33a and a light receiver 33b disposed in opposing relationship with respect to each other on the opposite sides of the path of the slits 32, counts the number of slits 32 which have passed therethrough. In this manner, the combination of the slits 32 and the photo-interrupter 33 form together a lens displacement detector 34, which produces an address signal (representing a count of the slits 32), which is then shaped and then fed to the AF CPU 22.

The AF CPU 22 delivers a sub-lamp (hereafter abbreviated as S lamp) signal to the bipolar II circuit 15 for controlling the AF auxiliary light circuit 27, allowing an S lamp 27a to be illuminated when an object being photographed is under a low brightness and exhibits a low contrast.

The AF display 24 connected to the AF CPU 22 includes an in-focus OK displaying LED (light emitting diode) 24a which is illuminated when an in-focus condition is reached, and an in-focus disabled displaying LED 24b which is illuminated when an in-focus condition cannot be reached. It will be noted that the AF CPU 22 has a clock oscillator 35 and a reset capacitor 36 connected thereto.

Data is also transmitted between the AF CPU 22 and the A/D converter 21 through the bus line, with a direction of transmission being controlled by a bus line control signal. The AF CPU 22 delivers a sensor switching signal and a system clock signal to the conveter 21. The A/D converter 21 may deliver a CCD drive clock signal and a CCD control signal to the in-focus sensor 20 which may comprise a CCD, thus reading a CCD output from the sensor 20 and converting it into a digital version for input to the AF CPU 22.

A flowchart illustrating a program executed by a microcomputer, which essentially comprises the AF block together with the associated circuit shown in FIG. 3 of a camera incorporating the apparatus of the invention which delivers distance information, will be described. As shown in FIG. 2, the supply voltage $V_{DD}$ is supplied to the AF block by turning the transistor 23 on in response to the activation of an AF power control circuit within the main CPU 14. This initiates the execution of a power-on reset routine shown in FIG. 4. Upon initiation of the power-on reset routine, an I/O initialize subroutine initializes the drive circuit in the AF block. Specifically, the AF display 24, the AF motor drive circuit 26 and the AF auxiliary light circuit 27 are turned off while the serial communication line leading to the main CPU 14 is initialized.

A mode read subroutine is then entered in which a mode signal on the mode line extending from the main CPU 14 is read to determine which lens drive mode is to be executed. A timer routine then follows which continues for a given time interval, whereupon the mode read routine is again entered, thus reading the point in time when the mode is switched. The program then returns to the initial mode read routine until the mode switching is completed. The mode read subroutine is passed twice with the timer routine interposed in order to prevent an inadvertent read operation which may occur at the time the mode is being switched.

When the mode switching has been made in a positive manner and the mode before and after the switching are equal to each other, the mode which is established after the switching is read, thus transferring to a subroutine of each individual mode. Specifically, there are several lens drive modes, including "lens reset", "PF (power focusing)", "AFSIN (AF single)", and "AFSEQ (AF sequence)". When one of these modes is selected, the subroutine of the selected mode is executed, whereupon the program returns to the I/O initialize routine. When none of "lens reset", "PF", "AFSIN", and "AFSEQ" is selected, but "ELSE" mode is selected, this is regarded as noises simply, and the timer routine is entered, and after a given time interval, the program returns to the I/O initialize routine.

In the lens reset mode, the lens is forcibly moved to a position corresponding to infinity ($\infty$) whereby an absolute distance counter is cleared. This represents an initialization for the conversion of a relative distance signal, that is, a photometric output signal, which is provided by the in-focus sensor 20, into an absolute distance signal, by substituting a number of pulses corresponding to a movement from the infinity position therefor. When "lens reset" mode is selected, the program returns to the I/O initialize routine after 5 ms, for example, following the clearing of the absolute distance counter. The purpose of PF mode is to perform a lens focusing operation with a manual focusing or focus aid, by driving the distance ring of the lens by means of the lens drive motor 31 rather than manually. More specifically, the lens is driven forward or rearward in response to the on or off condition of PFUP (up) operating switch $SW_1$ and PFDN (down) operating switch $SW_2$ which will be described later. The operation in the AFSIN mode represents a one shot AF operation, locking the focus upon an object being photographed subsequent to the AF operation. On the contrary, the AFSEQ mode represents a continuous AF operation, in which the AF operation takes place continuously as long as a release button remains operated to its first step.

Four operating switches $SW_1$ to $SW_4$, indicated in the Table 1 below, are used in the various lens drive modes.

TABLE 1

| Switch | $SW_1$ (up) | $SW_2$ (down) | $SW_3$ (PF) | $SW_4$ (speed) | Mode |
|---|---|---|---|---|---|
| AF mode | OFF | OFF | OFF | * | lens reset |
|  | OFF | ON | OFF | * | AFSIN |
|  | ON | ON | OFF | * | AFSEQ |
|  | ON | OFF | OFF | * | (OFF) |
| PF mode | ON | ON | ON | * | STOP |
|  | ON | OFF | ON | OFF | PFUP; LO |
|  |  |  |  | ON | PFUP; HI |
|  | OFF | ON | ON | OFF | PFDN; LO |
|  |  |  |  | ON | PFDN; HI |
|  | OFF | OFF | ON | * | STOP |

*indicates either ON or OFF (i.e. "doesn't matter").

The first and the second operating switches $SW_1$, $SW_2$ shown in the Table 1 are used in common in both the AF mode and the PF mode. When a third operating switch $SW_3$ is off, the AF mode is selected while when it is on, the PF mode is selected. The lens reset mode is established during the AF mode when the first and the second operating switch $SW_1$, $SW_2$ are both off, while the AFSEQ mode is established when these switches are both on. The AFSIN mode is established when the first operating switch $SW_1$ is off while the second operating switch $SW_2$ is on. STOP mode is established during PF mode when the first and the second operating switch $SW_1$, $SW_2$ are both off or both on. The PFUP (up) mode in which the lens is driven forward by rotating the distance ring toward a near distance by means of a motor is established during the PF mode when the first operating switch $SW_1$ is on. When the second operating switch $SW_2$ is on, the PFDN (down) mode in which the distance ring is rotated toward the infinity is established. As to a fourth operating switch $SW_4$, any mode in the AF mode or the stop mode in the PF mode remain unchanged if this switch is either on or off. However, if the switch is on during the PF mode, HI (high speed) mode is established, causing a coarse movement of the distance ring through a high speed rotation of the lens drive motor 31. LO (low speed) mode is established when the switch is off, causing the motor 31 (see FIG. 3) to rotate at a low rate to effect a fine adjustment of the distance ring.

Operations which occur in the various lens drive modes will now be described with reference to flowcharts shown in FIGS. 5 to 9. Initially, when the AFSIN mode is selected, the AFSIN routine shown in FIG. 5 is executed. Initially the AFENA signal from the main CPU 14 is examined if it is at its "H" level (active). The AFENA signal becomes active in response to an operation of the release button to its first step, whereupon the AF operation is initiated calling for "AFSIN2" subroutine. However, it should be noted that an operation of the release button to its second step is enabled only when the AF operation has been completed to reach an in-focus condition, thereby initiating an exposure sequence. In the AFSIN2 subroutine, the CCD integral of the in-focus sensor 20, the calculation of a photometric output and a lens drive take place. The consequence of the AF operation in the AFSIN2 subroutine is the display of either an in-focus or out-of-focus condition, which is effected subsequent to the operation of the AFSIN2 subroutine while monitoring AF status flags. The AF status flags include a low contrast flag (hereafter abbreviated as LC flag) which is set to "1" whenever an object being photographed exhibits a low contrast, a move flag (hereafter abbreviated as M flag) which is set to "1" whenever an object being photographed is moving, and a nearest flag (hereafter abbreviated as N flag) which is set to "1" whenever the lens is or is attempted to be fed forward to a distance equal to or less than the nearest distance. An in-focus condition can be reached when all of these flags are "0" while the in-focus condition cannot be reached if any one of these flags is set. Thus, when the AF status flags are monitored and are found to be "0", LED 24a in the AF display 24 displays an in-focus OK. If any one of the AF status flags is not "0", LED 24b indicates that the in-focus condition cannot be reached. In the event the in-focus condition is reached, EOFAF signal is produced to terminate the AF operation, whereby the main CPU 14 is in its standby mode, waiting for the operation of the release button to its second step or the initiation of the exposure sequence. Thus, once the in-focus condition is reached, the sebsequent lens operation is inhibited if the AFENA signal is active, thus leaving the in-focus OK displaying LED 24a illuminated to achieve a focus lock condition. When the AFENA signal from the main CPU 14 assumes its "L" level (inactive), the program returns to the beginning of the flowchart or the power-on/reset step shown in FIG. 4.

Figure 6:
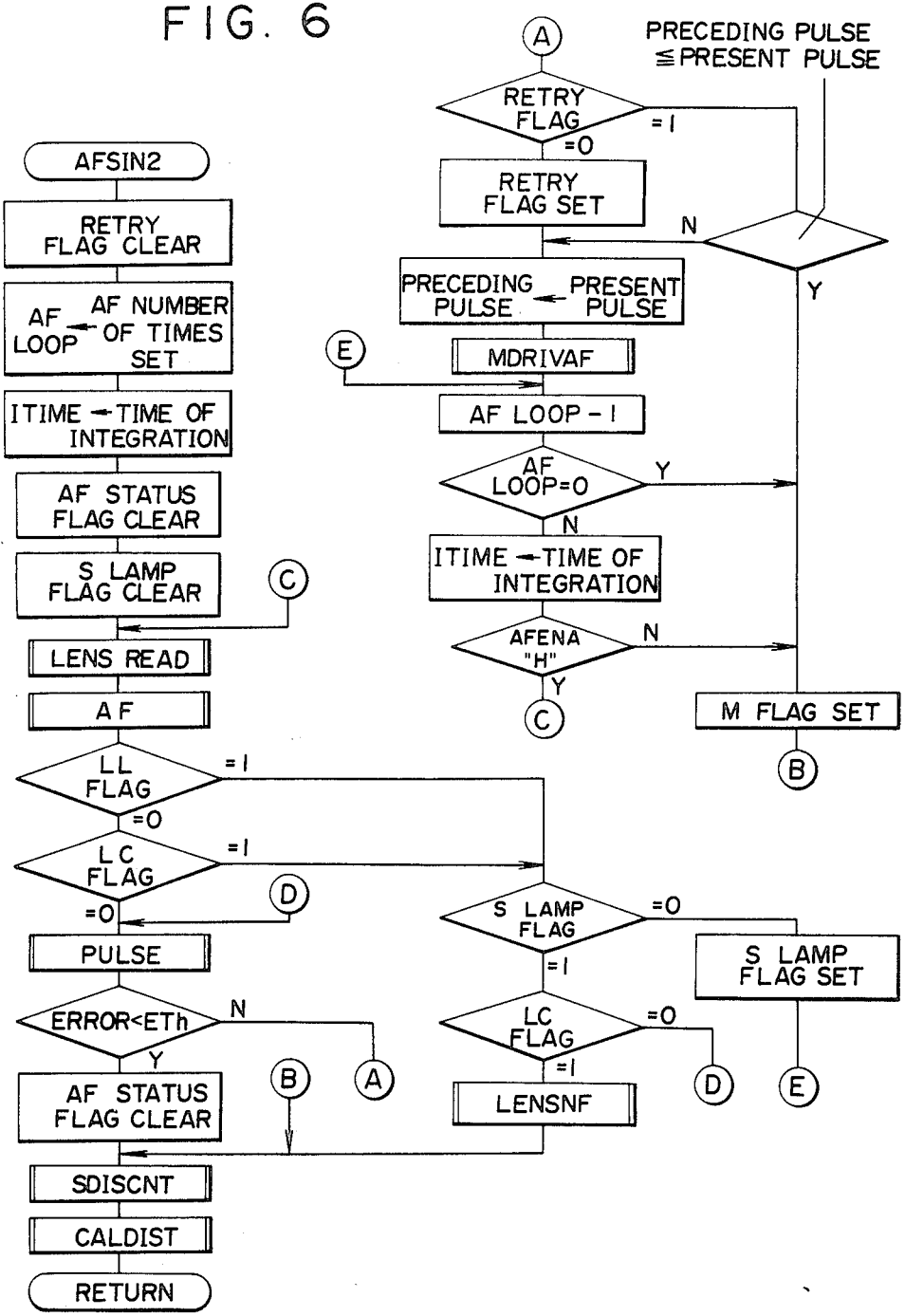

During the operation in the AFSIN mode, the operation of the AFSIN2 subroutine takes place in a manner indicated in FIG. 6. Initially, RETRY flag is cleared to enable a comparison of a result of calculation with a current photometric value (current output pulse from the in-focus sensor 20) against a result of calculation with a previous photometric value (previous output pulse from the sensor 20), and a maximum number of photometric operations allowed in a series of AF operations is loaded into an AF loop counter. Subsequently, a maximum value of CCD integration time is loaded into ITIME register in order to assure that CCD integration occurs positively for a brightness above a given level. The AF status flag is cleared as is S lamp flag. The initialization which precedes the initiation of the AF operation is completed at this point. Then "lens read" routine is called to read various data relating to the lenses which are stored in the lens data circuit 18, followed by calling of the AF routine for photometry. In the AF routine, it is determined whether or not it is necessary to illuminate the S lamp 27a during the CCD integration, and the S lamp flag is set when the illumination is required or cleared when unnecessary. A low light flag (hereafter abbreviated as LL flag) which is set to "1" when an object being photographed is under a low light level is either set or cleared as is LC flag.

When both LL and LC flags are cleared after the completion of the photometric operation in the AF routine, a "pulse" routine is called in order to calculate the amount of drive required for the lens. Specifically, in the pulse routine, the photometric value obtained by the operation of the AF routine must be converted into the magnitude of a travel which is required for each interchangeable lens. To this end, a variable magnification factor and associated information is read from the lens data circuit 18, and used in combination with a calculation output, or the result of calculation with the photometric value, to determine the number of pulses (address signal) which is equivalent to the magnitude of a travel distance to a point which is in focus.

Subsequently, the calculation output value from the AF operation (ERROR) and an AF accuracy threshold (ETh) read from the lens data circuit 18 are compared against each other, and if the calculation output value (ERROR) is greater than the threshold ETh, the program proceeds to Ⓐ to examine RETRY flag. During the first pass of the AF operation, RETRY flag is "0", and thus RETRY flag is set and the number of drive pulses is saved. During the second and subsequent pass of AF operation, the current number of drive pulses is compared against the previous number of drive pulses since the RETRY flag has already been set. If the current number of pulses is less than the previous number of pulses by an amount corresponding to the travel, this means that the lens has been driven to approach a point in focus. Accordingly, it is expected that the next lens drive will bring it closer to the point in focus. Hence, the current or present pulse is saved in place of the preceding pulse. "MDRVAF" routine is now called to drive the lens.

The purpose of comparing the present pulse against the preceding pulse is to prevent a diversion of the entire AF sequence. They may be compared in several manners including comparing the present number of pulses against the preceding number of pulses multiplied by 0.5 or comparing the present number of pulses against the preceding number of pulses multiplied by 1.5. When there is a likelihood of diversion for the system of the AF sequence, the lens drive is quickly interrupted since it is possible that the AF operation may take place during the movement of an object being photographed, thus preventing a wasteful AF operation. M flag is set and the program proceeds to Ⓑ, calling "SDISCNT" and "CALDIST" routines.

After the lens drive has taken place in response to the "MDRIVAF" routine, the AF loop counter in which the number of AF operations, utilized for the photometry, is preset, is decremented by one. Unless the resulting count in the AF loop counter is equal to 0, an integration time is loaded into ITIME register, and the program returns to Ⓒ to perform the next pass of AF operation when the AFENA signal is active or when the release button has been operated to its first step. In this manner, the AF operation which extends between the points ⓒ — ⓒ is repeated, each time decrementing the AF loop counter by one, and the point in focus is gradually approached. However, if the calculation output value (ERROR) cannot be reduced less than the AF accuracy threshold (ETh) when the AF loop counter reaches a count of 0, this means the inability to achieve an in-focus condition, thus setting M flag.

When ERROR <ETh is achieved as a result of the AF operation extending between ⓒ — ⓒ or when the calculation output value from the AF operation (ERROR) is reduced to a value within a range of focusing errors, the AF status flag is cleared indicating that an in-focus condition is reached, followed by calling "SDISCNT" and "CALDIST" routines.

When the LL flag or LC flag is set subsequent to the operation of the AF routine, the S lamp flag is examined. If the S lamp flag has been previously set to "1", this means that a low light and a low contrast condition has resulted even though the S lamp 27a has been illuminated during the time an integrating operation has taken place during the AF routine. Accordingly, the LC flag is again examined, and only when the low contrast prevails, "LENSNF" "(unable to focus the lens)" routine is called, providing a positive display of the inability to reach an in-focus condition. In "LENSNF" routine, the lens is once moved forward to the nearest position and then retracted to the infinity (∞) position, thus utilizing a movement of the lens over an increased distance to present a positive indication of the inability to reach an in-focus condition to a user. Alternatively, a movement of the lens from its infinity position to its nearest position may be used as an indication of the inability to reach an in-focus condition. In the "LENSNF" routine, bringing the lens to its infinity position allows the absolute distance counter, which saves the number of drive pulses (the number of move address signals) from the infinity position of the lens distance ring, to be initialized. Unless the low contrast condition prevails, this means that the AF operation has taken place in spite of the low light condition, and accordingly the program returns to ⓓ.

In the event the S lamp flag has been previously cleared, this means that the S lamp 27a has been deenergized previously, and hence if the LL flag or LC flag has been set, the program sets the S lamp flag and proceeds to ⓔ. Subsequently, during the second and subsequent pass of the AF operation, the S lamp 27a will be illuminated.

In any event, at the end of the operation for AFSIN2 routine, "SDISCNT" routine is called and executed, followed by calling "CALDIST" routine. In the SDISCNT routine, the absolute distance counter is loaded with a number of drive pulses from the infinity position of the distance ring. In CALDIST routine, the absolute magnitude of a distance to an object being photographed is calculated on the basis of the number of pulses contained in the absolute distance counter and the absolute distance factors a and b contained in the lens data circuit 18, and the calculated absolute distance and the content of the absolute distance counter are fed to the main CPU 14. The calculation of the absolute magnitude of the distance in CALDIST routine will be described in further detail later. After the execution of CALDIST routine, the program returns to a point in the flowchart for the "AFSIN" routine shown in FIG. 5 which is located behind "AFSIN2".

Figure 4:
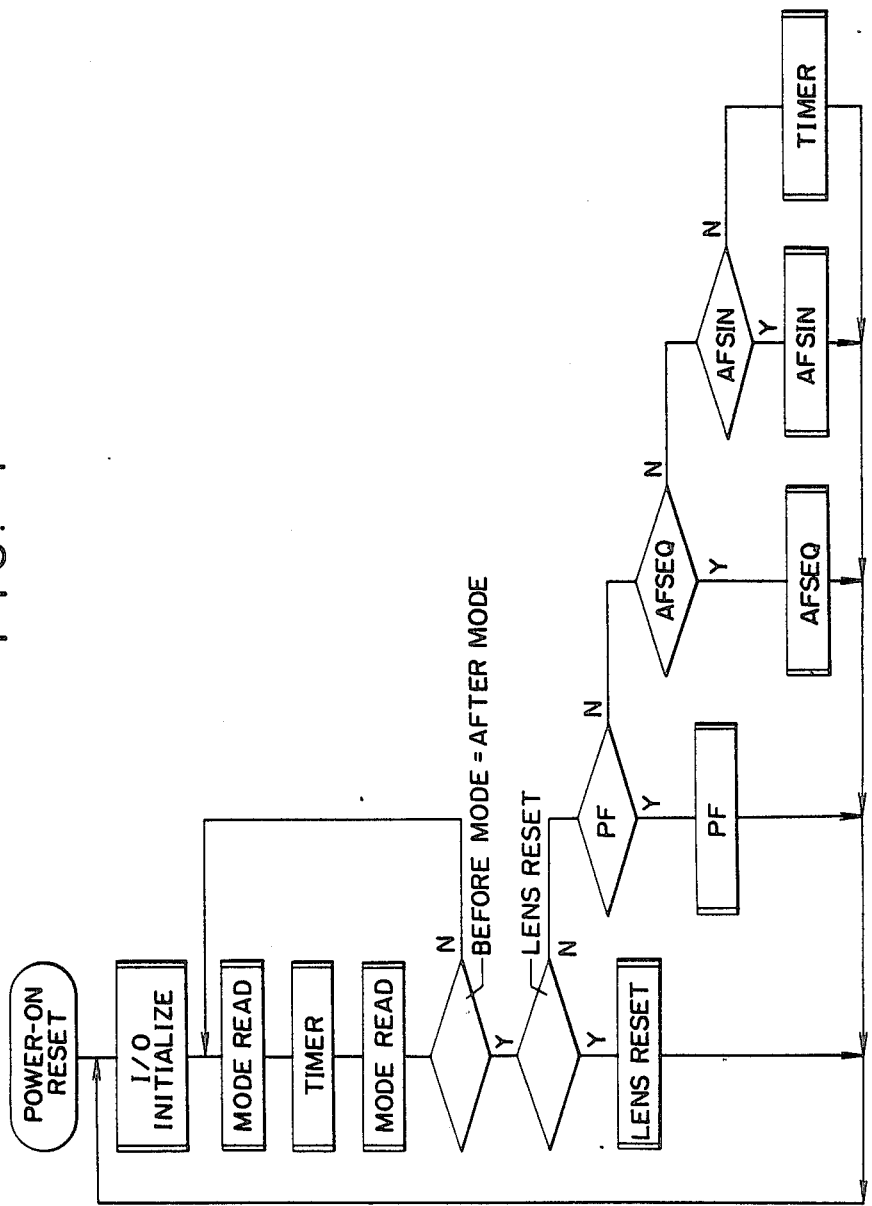
FIGS. 4 to 9 are flowcharts illustrating one example of a program associated with an AF CPU shown in FIG. 3.
Figure 5:
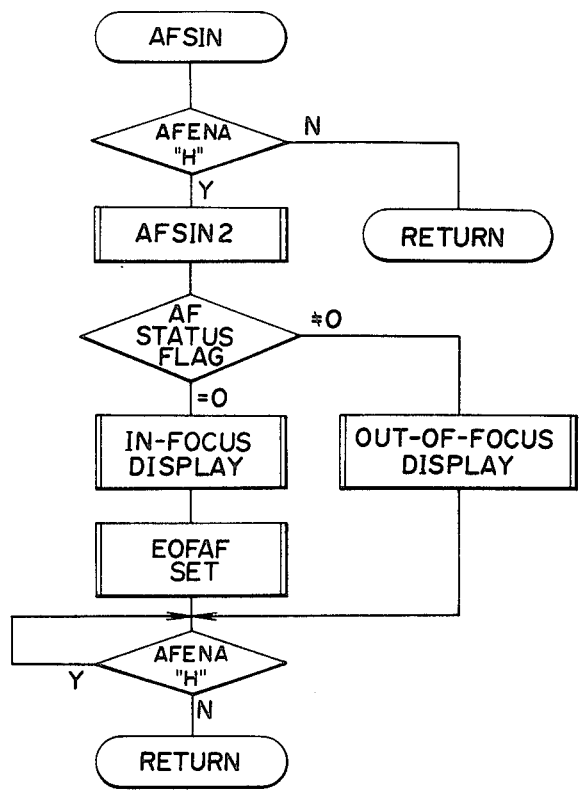
Figure 7:
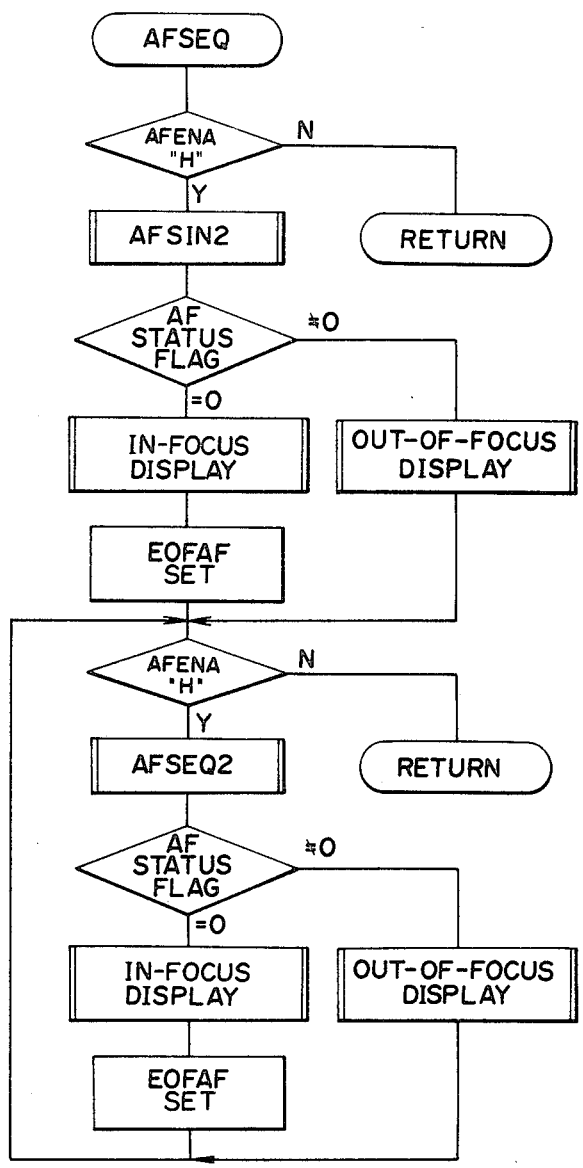

Returning to the flowchart of FIG. 4, when "AFSEQ" mode is selected, "AFSEQ" routine shown in FIG. 7 is called. In the AFSEQ routine, when the release button has been operated to its first step, the AF operation during the first pass until EOFAF signal becomes active remains the same as in AFSIN routine. Thus, in both AFSIN and AFSEQ routines, the operation of the AFSIN2 subroutine takes place, positively indicating to a user the inability to reach an in-focus condition, by driving the lens in an abnormal manner.

As mentioned previously, in the operation of AFSIN subroutine, the S lamp 27a is used to assist in the photometry for the AF operation when the low light and the low contrast conditions prevail. If it is attempted to utilize the S lamp 27a in a similar manner for the consecutive passes of the AF operation in AFSEQ mode, the S lamp 27a will be continuously illuminated during the time a CCD integrating operation occurs for the AF routine, causing an increase in the current drain and a reduced efficiency due to a heating of the S lamp 27a. In addition, if the lens is driven in an abnormal manner and consecutively in the event an in-focus condition cannot be reached, a user may be concerned about this.

Accordingly, in the AFSEQ routine, after a single pass of the AF operation to set EOFAF signal, the AFENA signal is examined, and if this signal is active, indicating that the operation of the release button to its first step is maintained, "AFSEQ2" routine is called. If AFENA signal is inactive, this means that the operation of the release button to its first step is off or its operation to a second step is on, and the program returns. In the AFSEQ2 subroutine, CCD integration of the in-focus sensor 20, AF calculation and lens drive take place as will be mentioned later, but neither a positive indication of the inability to reach an in-focus condition through an abnormal drive of the lens nor the illumination of the S lamp 27a for assisting in the photometry occurs. The AF status flag as a result of the operation for the AFSEQ2 subroutine is examined, and an in-focus OK is displayed if the flag is 0, but the inability of reaching an in-focus condition is displayed if it is not equal to 0. Subsequent to the display of an in-focus OK, EOFAF signal is produced, enabling the initiation of the exposure sequence by operating the release button to its second step. After EOFAF signal has been produced or the inability of reaching an in-focus condition has been indicated, AFENA signal is again examined. Accordingly, as long as the operation of the release button to its first step is maintained, the AF operation which is centered about AFSEQ2 subroutine takes place continuously. When AFENA signal becomes inactive, the program returns to the beginning of the flowchart shown in FIG. 4, which is power-on/reset. The EOFAF signal is cleared after the CCD integration during the next pass of AF operation or during I/O initialize (see FIG. 4) after the program has returned.

Figure 8:
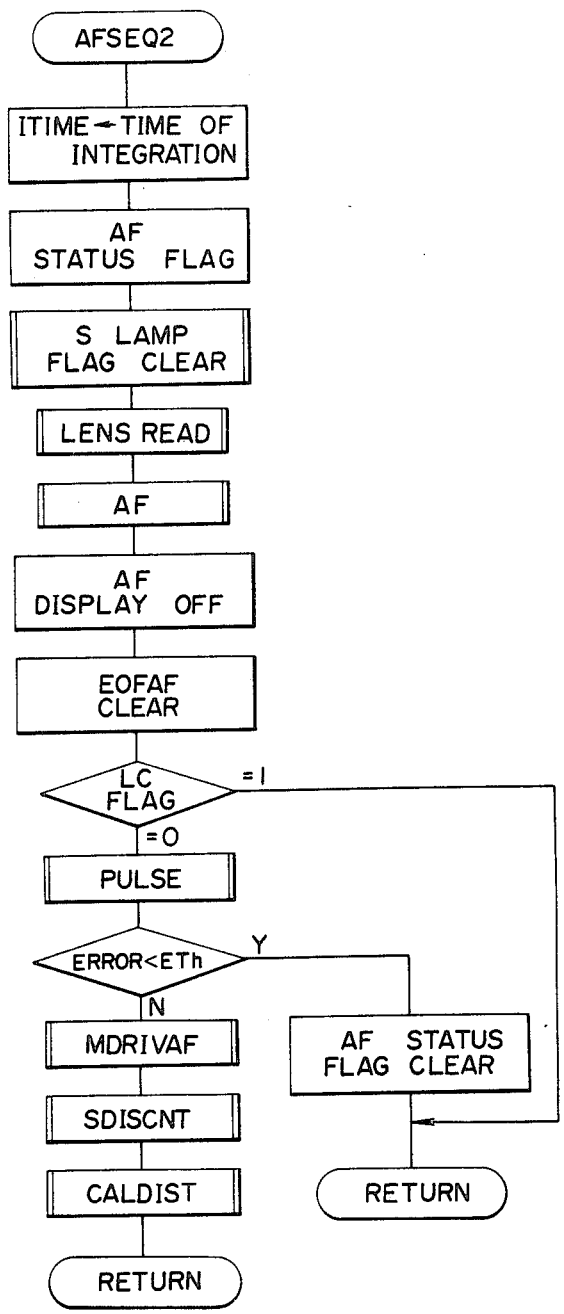

In the flowchart of AFSEQ mode, the operation for the AFSEQ2 subroutine takes place in a manner indicated in FIG. 8. Initially, an integrating time is loaded into ITIME register, the AF status flag is cleared, and the S lamp flag is cleared. Subsequently, the "lens read" subroutine is called, thus reading lens data which is stored in the lens data circuit 18. In the AF subroutine, the photometric operation takes place. Subsequently, the AF display circuit 24 is turned off once, preventing the in-focus OK display LED 24a and the in-focus disabled displaying LED 24b from being illuminated. In other words, the AF display is disabled during the lens drive. Subsequently, EOFAF signal is cleared, and the LC flag is examined. If the low contrast condition is found, the program returns. Otherwise, "pulse" subroutine is called. It is to be noted that the examination of the LL flag is omitted for the reason that if the low light condition prevails, the calculation with the photometric value is possible if the contrast is safisfactory. In the "pulse" subroutine, the calculation output value obtained by the operation of AF subroutine is converted into a travel for each interchangeable lens. To this end, a variable magnification factor is read from the lens data circuit 18, and the number of drive pulses (the number of addresses) is calculated on the basis of the variable magnification factor and the calculation output value. The calculation output value (ERROR) is compared against the AF accuracy threshold ETh (which is lens data), and if ERROR is greater than the threshold ETh, "MDRIVAF" subroutine is called, performing a lens drive until a position in focus is reached. Subsequently, "SDISCNT" subroutine is called to load the number of drive pulses which is referenced to the infinity position of the lens into the absolute distance counter. Subsequently, in CALDIST subroutine, the absolute magnitude of a distance to an object being photographed is calculated on the basis of the number of drive pulses loaded into the absolute distance counter and the absolute distance factors a and b, which are lens data. The program then returns. The calculated absolute magnitude of distance and the number of drive pulses loaded into the counter are both fed to the main CPU 14. If ERROR is less than the threshold ETh within a range of focusing errors, the AF status flag is cleared and the program returns.

Figure 9:
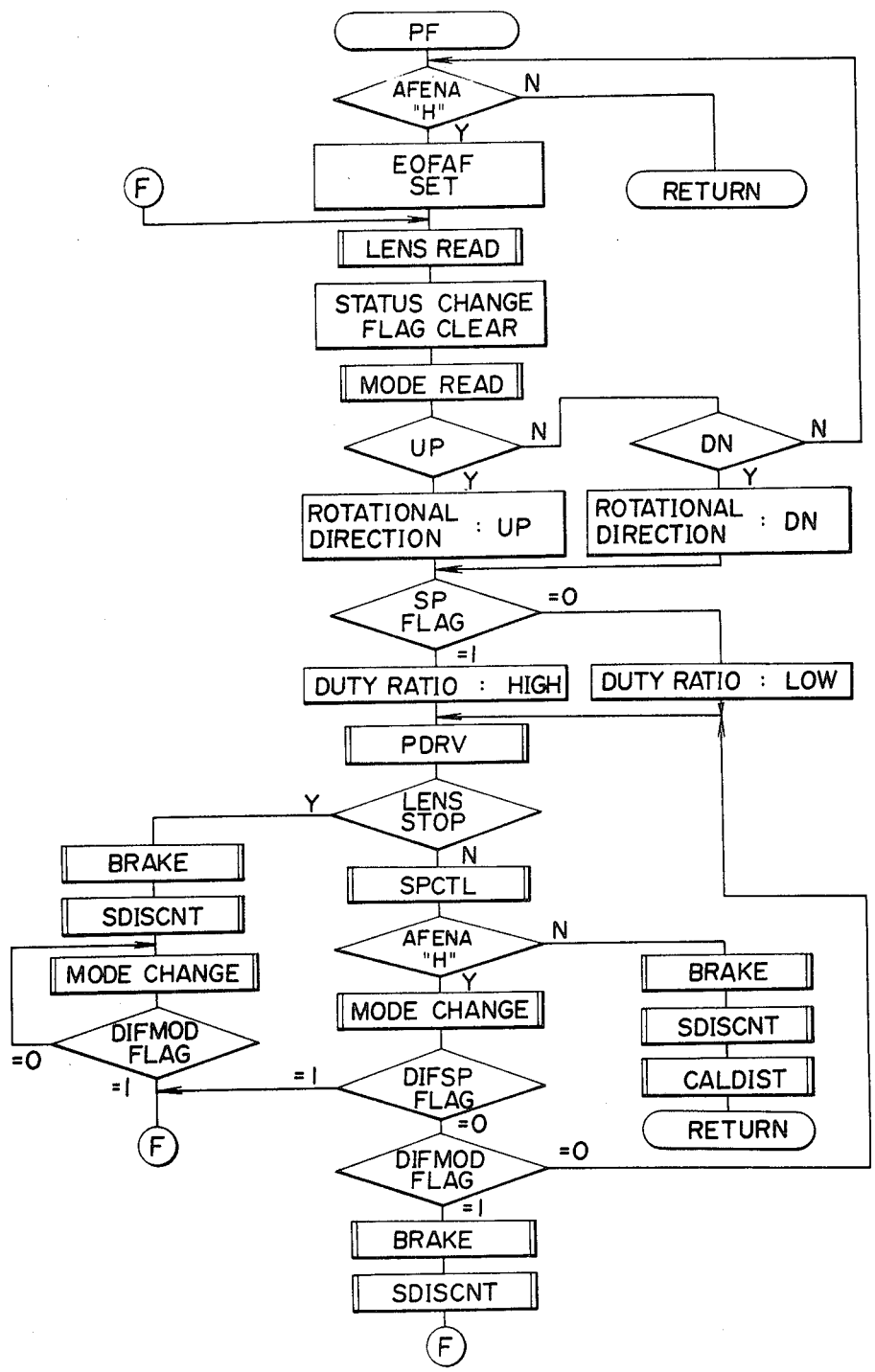

Returning to the flowchart of FIG. 4, when "PF" mode is selected, "PF" routine shown in FIG. 9 is called. In PF routine, AFENA signal is initially examined, and if it is inactive, the program returns. If this signal is active or if the release button has been operated to its first step, EOFAF signal is set to allow a response to the operation of the release button to its second step. In this manner, a transfer to the exposure sequence is enabled at any desired time during the PF routine. Subsequently, the "lens read" subroutine is called to read a power focus duty cycle or other lens data which are stored in the lens data circuit 18, followed by clearing a status change flag. A power focusing duty cycle includes a factor for HI speed and another factor for LO speed, respectively, for each lens. A status change flag includes DIFSP (speed change) flag which is set when the speed changes, and DIFMOD (mode change) flag which is set when the mode changes. "Mode read" subroutine is then called, and commands for the direction of rotation of the lens and the speed of driving the lens are read. UP (up) and DN (down) flags indicating the direction of rotation of the lens as well as SP (speed) flag are set or cleared accordingly. In other words, the on and off conditions of the operating switches $SW_1$ to $SW_4$ relating to the lens drive mode indicated in the Table 1 are read. In the PF mode, the operating switch $SW_3$ is on. Whenever PFUP operating switch $SW_1$ is turned on, the direction of rotation of the lens will be in the UP (driving the lens forward) direction while when PFDN operating switch $SW_2$ is turned on, the direction of rotation of the lens will be in the DN direction (retracting the lens). The SP flag is then examined, but when the operating switch $SW_4$ is turned on, the SP flag is set. In this instance, the duty cycle of the pulse current which drives the lens drive motor 31 (see FIG. 3) will be established at a high level, feeding the lens forward or retracting it at high speed. When the operating switch $SW_4$ is turned off, the SP flag is cleared. In this instance, the duty cycle of the motor drive pulse current will be established at a low level, moving the lens at a slow rate. Subsequently, the "PDRV" subroutine is called. In PDRV subroutine, the on/off control of the motor 31 is based upon the established duty cycle, driving the lens for one pulse. Then follows a decision to determine if the lens has reached and remains at rest at its Infinity or nearest limit position, and if it is at rest at such limit position, the motor is braked for a time duration on the order of 100 ms, followed by calling "SDISCNT" subroutine to load the absolute distance counter. The program then loops around the "mode change" subroutine while maintaining such condition to see if there is any change in the mode signal. In the mode change subroutine, a change in the status of PFUP operating switch $SW_1$, PFDN operating switch $SW_2$ (mode change) and in the status of the speed operating switch $SW_4$ (speed change) are examined. In the event a change in the mode is detected, DIFMOD flag is set, and if there is a change in the speed, DIFSP flag is set. If DIFMOD flag is set, the program responds thereto by returning to Ⓕ.

On the other hand, during a normal power focusing operation in which the lens has not reached either limit position, a fine adjustment of duty cycle for the motor is made in the "SPCTL" routine so that a lens drive speed for a coarse or fine movement is achieved. In this manner, the speed control of the lens drive motor is performed by "PDRV" and "SPCTL" subroutines. AFENA signal is then examined. If it is active or if the release button has been operated to its first step, the "mode change" subroutine is called, and if there is a change in the speed and DIFSP flag has been set, the program directly returns to Ⓕ. If there is no change in the speed and DIFMOD flag has been set to indicate a change in the mode, a "brake" subroutine is called to bring the motor to a stop. The absolute distance counter is loaded in the SDISCNT subroutine, and the program returns to ◯. In the event there is no change in the speed or mode, the program returns to PDRV subroutine, and as long as the release button remains operated to its first step, the PF operation according to PDRV and SPCTL subroutines continues.

When the operation of the release button to its first step is turned off, AFENA signal becomes inactive or the termination of the PF operation is commanded by the main CPU 14. The "brake" subroutine is called to bring the motor to a stop, and the absolute distance counter is loaded in the SDISCNT subroutine. Based on the content of this counter or the number of move addresses from the infinity position and the absolute distance factors a and b stored in the lens data circuit 18, the absolute magnitude of distance is calculated according to the CALDIST subroutine and is fed to the main CPU 14. The program then returns from the CALDIST subroutine to the initial step or power-on/reset step.

The formula which is used to calculate the absolute magnitude of distance in the CALDIST subroutine which appears in several flowcharts shown in FIGS. 6, 8 and 9 will now be described. As mentioned previously, a number of pulses (address signals) which is equivalent to a travel of the lens from its infinity position is loaded into the absolute distance counter. Accordingly, if the lens travel can be approximated by a linear function, it is possible to determine the absolute magnitude of distance by calculation.

Figure 10:
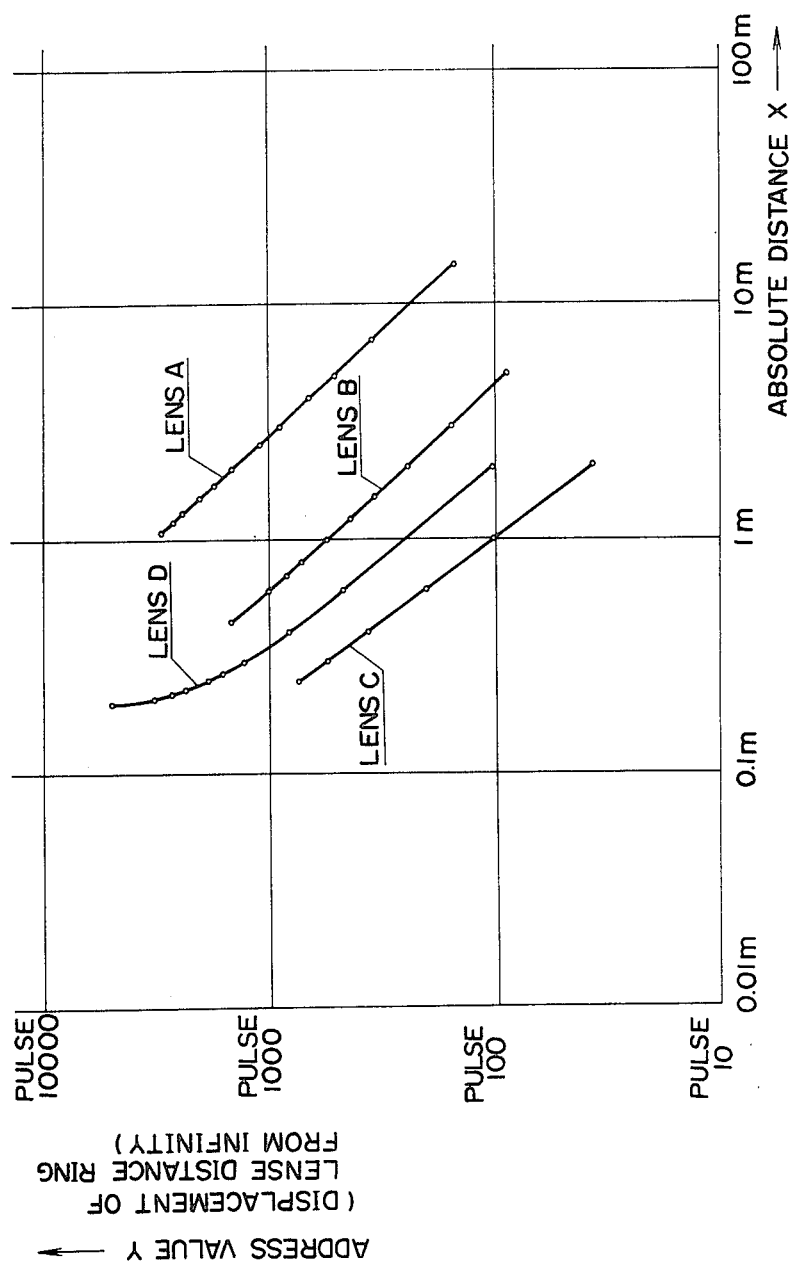
FIG. 10 graphically shows a displacement of a lens plotted against an absolute distance for several interchangeable lens barrels.

As a result of the investigation of the relationship between the lens travel and the absolute magnitude of distance for each interchangeable lens barrel, it is found that the relationship can be represented by a linear function on log-log scale for lenses A, B, C and D except for macro regions, as illustrated in FIG. 10. Thus representing the lens travel by y and the distance by x, we have $$\log_{10} y = -\alpha \log_{10} x + \beta \quad (1)$$

However, it is to be noted that the lens travel is referenced to the infinity position, and both $\alpha$ and $\beta$ in the above equation are positive. By converting both sides of the equation (1) into exponential functions, we have $$y = \frac{10^\beta}{x^\alpha} \quad (2)$$

Thus it is seen that y is an $\alpha$-order function of x. By designing a cam which achieves a feed relative to the angle of rotation of the distance ring such that $\alpha=1$, there will be enabled a calculation of the absolute magnitude of distance which is free from any error. However, in practice, such design of a cam is difficult to achieve, and accordingly in the actual design of the lens, a hyperbolic function is chosen to provide a simpler approximation:

$$y = \frac{b}{x-a} + c \quad (3)$$

In the equation (3), y represents the magnitude of feed from the infinity position of the lens, or the number of address signals which is saved in the absolute distance counter, and x represents the absolute magnitude of distance. It then follows that when $x=\infty$, $y=0$ (meaning that the feed of the lens will be zero when the distance is at infinity), thus, we may choose $c=0$ in the equation (3), whereby the approximation is simplified as follows:

$$y = \frac{b}{x-a} \quad (4)$$

This equation can be represented by the logarithmic function as follows:

$$\log y = \log b - \log (x-a) \quad (5)$$

Figure 11:
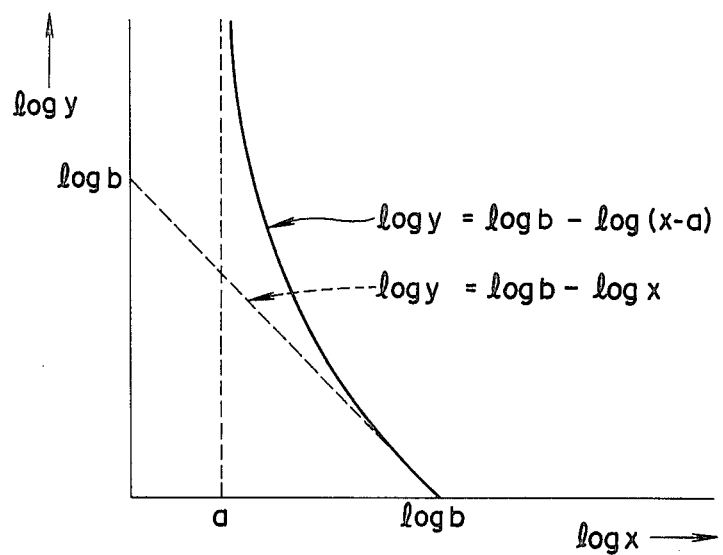
FIG. 11 graphically shows an approximate characteristic of an absolute distance relative to the displacement of a lens which is employed in one embodiment of the invention.

The equation (5) is graphically shown in FIG. 11, and it will be seen that the equation (5) represents a curve having asymptotes indicated by $\log y = \log b - \log x$ and $x=a$, both of which are rectilinear lines. A change in the value of a changes the curved portion. In other words, the relationship between the absolute magnitude of distance relative to the lens travel for each interchangeable lens can be approximated by utilizing the rectilinear line portion and the curved line portion of the equation (5). It will be evident that in the equation (5), both a and b are positive, and a has a value which cannot be greater than the nearest distance of the lens. These values a and b are absolute distance factors which are contained in the lens data circuit 18.

When the absolute magnitude of distance relative to the lens travel is to be determined according to the equation (5) in actuality, it is necessary to determine the absolute distance factors a and b. When determining such absolute distance factors a and b. a graph as illustrated in FIG. 10 is drawn for each lens barrel, and the equations for the rectilinear lines are formed corresponding to the equation (1), thus deriving the equation (2). Based on the equation (2) obtained, the values a and b shown in the approximation equation (4) are determined. Specifically, if the error is to be reduced to zero for a reference distance, for example, 3 m, the value of $x=3$ m is substituted into the equations (2) and (4), thus deriving several combinations of a and b which appear in the equation (4). A particular combination of (a, b) which provides a minimum error within a desired range of distances is then searched. For example, if the distance must be changed between $x=1$ m and $x=10$ m, (a, b) which provides a minimum error from the both equations over this range is determined. When (a, b) is determined in this manner, the curve according to the equation (5) is determined. Thus, the absolute magnitude of distance x can be determined from the value of y or the number of addresses which is saved in the absolute distance counter.

Figure 12:
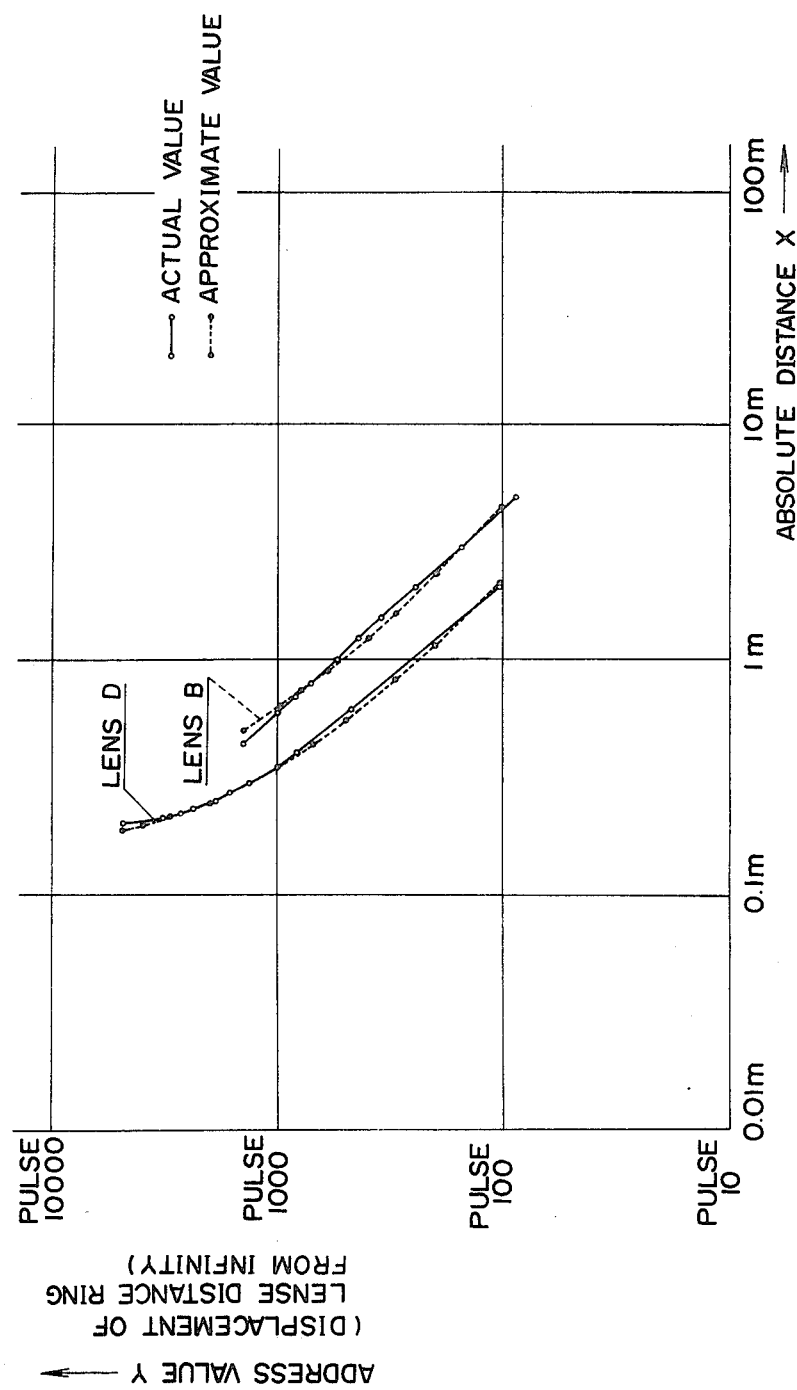
FIG. 12 graphically shows the characteristic of selected lens barrels shown in FIG. 10, illustrating both the actual values and the calculated values obtained according to the approximation formula.

The characteristic curve represented by the approximation (5) is compared against actual values for lenses B and D in FIG. 12. As a modification, a characteristic curve for a single lens may be divided into several regions, each of which is formed by a curve defined by different values of (a, b), so that a given combination of (a, b) is selected in correspondence to a position of the distance ring so that the absolute magnitude of distance can be calculated from the selected combination and the address value which is saved in the absolute distance counter. For example, in FIG. 12, the macro region of the lens D is approximated with a good accuracy by using a single combination of (a, b), but a piecewise approximation may be used instead. The absolute distance factors a and b may be carried by each interchangeable lens barrel as lens data or alternatively each individual interchangeable lens may be identified by a camera to allow a given combination of absolute distance factors a and b to be derived from ROM which is contained within AF CPU 22. If a minor error is permitted, $a=0$ may be used, allowing the absolute magnitude of distance to be determined as a function of b only. In the manner mentioned above, correct information representing a distance to an object being photographed a camera can be determined during the AF and the PF operation.

Where rattling or backlash of the drive system must be taken into consideration, the absolute distance factors a and b may be determined so as to accommodate for this. This technique will be particularly effective in removing the effect of the backlash.

Another embodiment of the invention will be described which enables the absolute magnitude of distance to be calculated to a higher accuracy. Errors which are involved in the calculation of the absolute magnitude of distance will be those produced when the quadratic function representing the relationship between the distance and the pulse (address) is replaced by the equation $y=b/(x-a)$. Since this represents a theoretical error, a remedy may be made by utilizing piecewise values of the absolute distance factors a and b. However, in actual implementations, rattling of the drive system such as the backlash of gears therein or oscillations which are produced as the lens abuts against stop members at the infinity position or the nearest position may give rise to pseudo-pulses. Accordingly, embodiments which are designed to minimize errors occurring between the drive system and the control system will be considered below.

Figure 13:
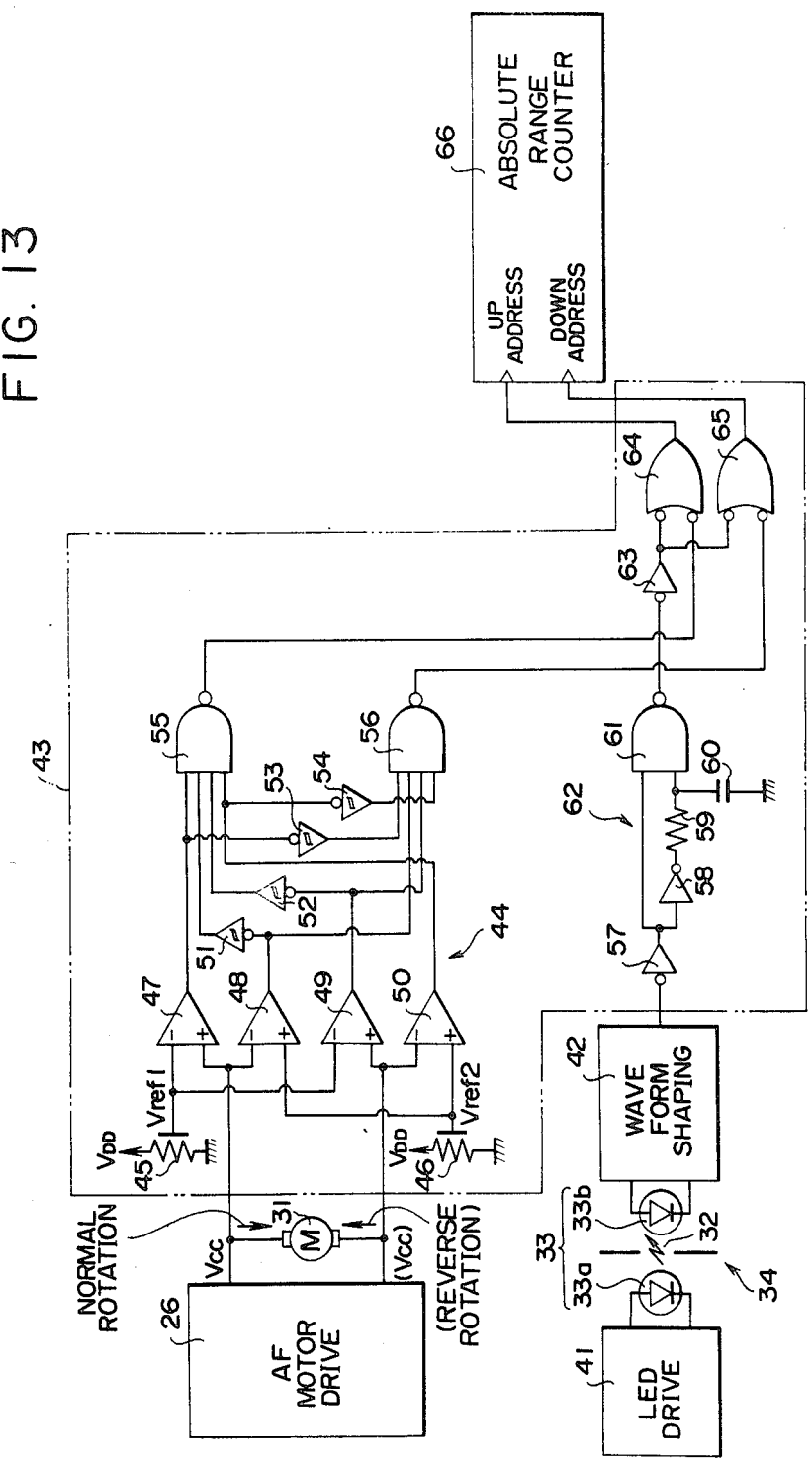
FIG. 13 is a circuit diagram of one embodiment of a pulse discriminator circuit for driving a counter which derives an absolute distance with a higher accuracy.

FIG. 13 shows an embodiment including a travel detector 34 formed by a single photo-interrupter 33 including a light emitter 33a and the light receiver 33b which are disposed on the opposite sides of a path for the slits 32 as shown in FIG. 3. The light emitter 33a comprises an LED element, which is driven by an LED drive circuit 41. A waveform shaper 42 shapes an output waveform from the light receiver 33b. Both of these circuits are contained in the bipolar II circuit 15 (see FIG. 3). A pulse discriminator circuit 43 enclosed in a block shown in double dot chain lines and which drives a counter is also contained within the bipolar II circuit 15.

The pulse discriminator circuit 43 incldes a motor direction determining circuit 44 which is able to detect whether the lens drive motor 31 is rotating in a normal forward or reverse direction based on the voltage across the motor 31. The circuit 44 comprises four comparators 47 to 50, four Schmidt trigger inverters 51 to 54 and a pair of four-input NAND gates 55, 56. Specifically, the motor 31 has its one terminal connected to a non-inverting input terminal of a first comparator 47 and to an inverting input terminal of a second comparator 48 while the other terminal of the motor 31 is connected to a non-inverting input terminal of a third comparator 49 and to an inverting input terminal of a fourth comparator 50. The inverting input terminals of the first and the third comparator 47, 49 are connected to a reference voltage unit 45 which provides a reference voltage $V_{ref1}$, and the non-inverting input terminals of the second and the fourth comparators 48, 50 are connected to another reference voltage unit 46 which provides a reference voltage $V_{ref2}$.

By way of example, the reference voltages applied to the comparators 47 to 50 are chosen such that $V_{ref1} \approx \frac{2}{3}$ Vcc and $V_{ref2} \approx \frac{1}{3}$ Vcc. When the motor 31 rotates in the forward direction, one terminal of the motor 31 assumes the voltage Vcc and accordingly, the comparators 47 to 50 provide an "H", "L", "L" and "H" output, respectively, and hence the gate 55 provides an "L" output while the other gate 56 provides an "H" output. When the motor 31 rotates in the reverse direction, the other terminal of the motor 31 assumes the voltage Vcc and accordingly, the comparators 47 to 50 provide an "L", "H", "H" and "L" output, respectively, and hence the gate 55 provides an "H" output while the other gate 56 provides an "L" output.

The pulse developed by the lens travel detector 34 in response to the rotation of the motor 31 is shaped by the waveform shaper 42, and is differentiated by a differentiated pulse generator 62 of known form including inverters 57, 58, resistor 59, capacitor 60 and NAND gate 61. The differentiated address pulse is fed through an inverter 63 to one input of each of OR gates 64, 65 which are low level active. An absolute distance counter 66 counts up a pulse which is input to its down address input terminal when its up address input terminal assumes "H" level, and counts down a pulse applied to its up address input terminal when its down address input terminal assumes "H" level.

When the gate 55 of the circuit 44 provides an output of "L" level, the up address input terminal of the absolute distance counter 66, which is contained in the AF CPU 22 (see FIG. 3), assumes "H" level independently from the input level applied to the other input of the gate 64, whereby it functions as an up counter. At this time, the other gate 56 of the circuit 44 provides an "H" output which is fed through the gate 65 to the down address input terminal of the counter 66, the latter then performing a count-up operation.

When the gate 56 of the circuit 44 provides an "L" output, the down address input terminal of the counter 66 assumes "H" level independently from the other input level to the gate 65, whereby the counter operates as a down counter. At this time, an "H" output from the gate 55 is fed through the gate 64 to the up address input terminal of the counter 66, which therefore performs a count down operation.

When the motor 31 is braked or ceases to operate, the opposite ends of the motor will be connected to the ground by the control system, producing a zero potential difference therebetween. At this time, both gates 55, 56 provide an "H" output, disabling the counter 66. Thus, in the embodiment shown in FIG. 13, if the photo-interrupter 33 develops a pulse as a result of an operation of the drive system in response to an external forced input when the motor 31 is to be stopped or if the motor 31 has reached the limit position for the lens and is braked, but has undergone a hunting to develop a pulse, a counting operation by the counter 66 is disabled, thus affording the advantage that an error in the absolute magnitude of distance is minimized.

In the circuit 44 described above, four comparators 47 to 50 are employed. However, a pair of comparators may be used to compare the terminal voltage Vcc of the motor 31 against a single reference voltage $V_{ref}(=\frac{1}{2}$ Vcc$)$. The use of four comparators 47 to 50 in the described embodiment prevents any malfunctioning of the counter 66 in the event the drive voltage of the motor 31 fluctuates due to noises. Specifically, if the higher potential of the motor 31 varies in a range from $\frac{2}{3}$ to 1 Vcc and the lower potential of the motor 31 varies within a range from $\frac{1}{3}$ Vcc to ground, the circuit 44 functions properly to determine the direction of rotation of the motor 31. A range of motor potential from $\frac{1}{3}$ to $\frac{2}{3}$ Vcc represents a deadband, in which the operation of the counter 66 is disabled.

Figure 15:
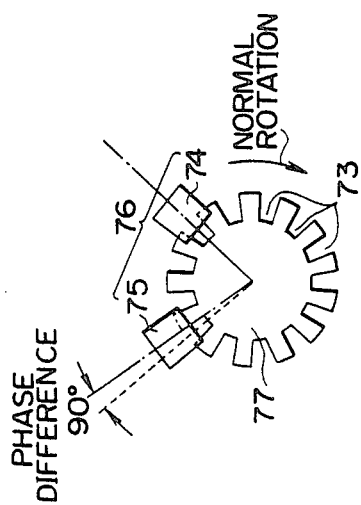
FIG. 15 is a schematic view showing a lens displacement detector shown in FIG. 14.
Figure 16:
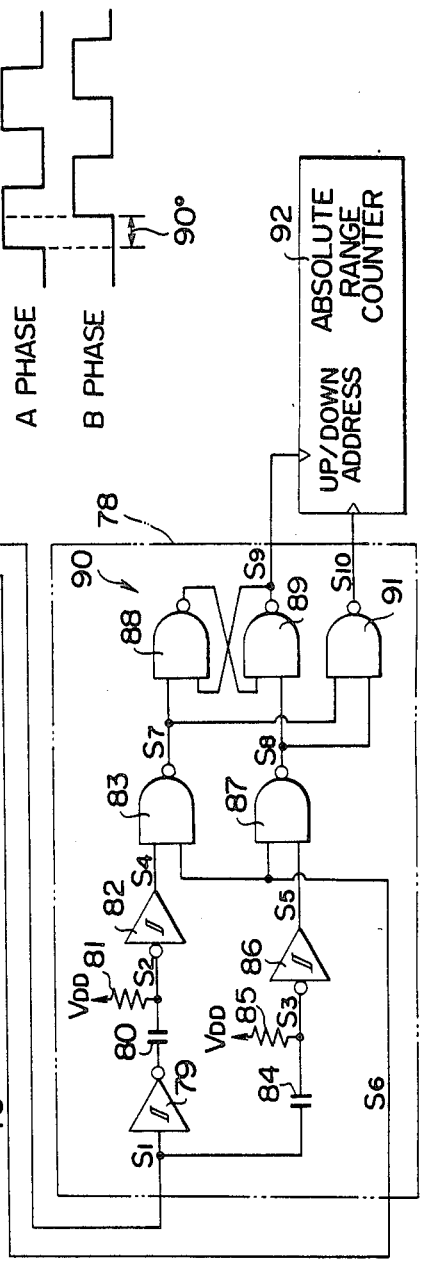
FIG. 16 is a series of timing charts illustrating A and B phase output waveforms from a waveform shaper shown in FIG. 14.
Figure 14:
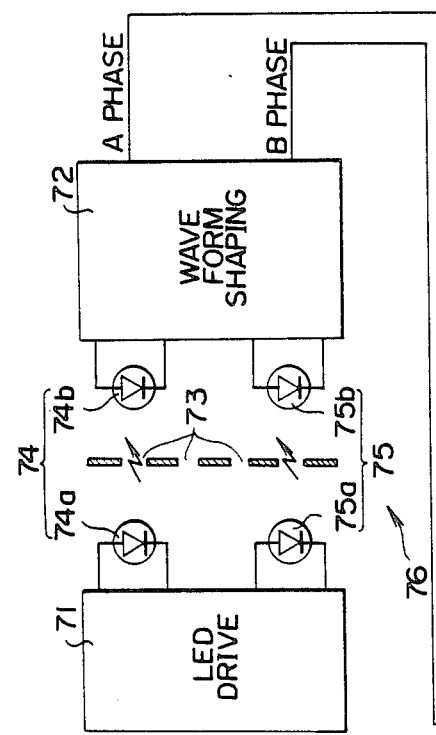
FIG. 14 is a circuit diagram of another embodiment of a pulse discriminator circuit.

FIG. 14 shows a third embodiment in which a lens travel detector 76 comprises a first photo-interrupter 74 including a light emitter 74a and a light receiver 74b disposed in opposing relationship with each other on the opposite sides of a path for slits 73, and a second photo-interrupter 75 similarly including a light emitter 75a and a light receiver 75b. This lens travel detector 76 is interposed between an LED drive circuit 71 and a waveform shaper 72. Referring to FIG. 15, the photo-interrupters 74, 75 of the lens travel detector 76 are disposed such that the waveforms developed by the respective photo-interrupters when detecting slits 73, formed in a rotatable member 77 disposed within a lens barrel which is driven for rotation by the motor, have a phase difference of 90° therebetween. Thus, as shown in FIG. 16, a shaped output from the first photo-interrupter 74 is illustrated as A phase while the shaped output from the second photointerrupter 75 is illustrated as B phase, which are phase displaced relative to each other by 90° during the forward rotation of the motor.

The waveform shaper 72 is connected to a pulse discriminator circuit 78 which in turn drives an asbolute distance counter 92. The pulse discriminator circuit 78 includes a delay circuit including capacitors 80, 84, resistors 81, 85 and Schmidt trigger inverters 79, 82 and 86 and operating to delay the A phase output from the waveform shaper 72, a pair of NAND gates 83, 87 which are connected to the output terminals of the delay circuit and the B phase output terminal of the waveform shaper 72, an R-S flipflop (hereafter abbreviated as RS-FF) 90 including NAND gates 88, 89 which are connected between the output terminals of the gates 83, 87 and up/down switched input terminals of the absolute distance counter 92, and an NAND gate 91 connected between the output terminals of the gates 83, 87 and an address input terminal of the counter 90.

The operation of the pulse discriminator circuit 78 will be described with reference to timing charts shown in FIGS. 17 and 18 which illustrate the waveforms of various signals appearing therein. When the motor 31 rotates in the forward direction, or when the lens is driven toward the infinity condition, the A phase output $S_1$ will be leading the B phase output $S_6$ by 90° as shown in FIG. 17. The A phase output $S_1$ is inverted by the Schmidt trigger inverter 79 and is converted into a waveform $S_2$ as it passes through a time constant circuit comprising capacitor 80 and resistor 81. On the other hand, the A phase output $S_1$ is also converted into a waveform $S_3$ as it passes through another time constant circuit comprising capacitor 84 and resistor 85, without inversion. The waveforms $S_2$ and $S_3$ are converted into waveforms $S_4$ and $S_5$, respectively, by passing through the Schmidt trigger inverters 82, 86, respectively. When the waveform $S_4$ and a B phase output $S_6$ are fed to the gate 83, the latter produces an output waveform $S_7$. When the waveform $S_5$ and the B phase output $S_6$ are fed to the gate 87, the latter produces an output waveform $S_8$. The waveforms $S_7$ and $S_8$ are input to RS-FF 90, which then produces an output waveform $S_9$ of "H" level. The waveforms $S_7$ and $S_8$ are also input to the gate 91, which then produces an output waveform $S_{10}$. Accordingly, the counter 92 counts up the falling edge of the waveform $S_{10}$.

When the motor 31 rotates in the reverse direction or when the lens is driven toward the nearest point, the A phase output $S_1$ will be lagging the B phase output $S_6$ by 90° as shown in FIG. 18. Accordingly, the various waveforms appearing in the pulse discriminator circuit 78 at this time will be as shown in FIG. 18, supplying a waveform $S_9$ of "L" level to the up/down switched input terminal of the counter 92, which then counts down the falling edge of the waveform $S_{10}$ applied to its address input terminal.

In this manner, in the embodiment shown in FIG. 14, by providing a phase displacement between the A phase output and the B phase output from the lens travel detector 76 to determine the direction of rotation of the motor 31, a switching between the count up and the count down operation of the counter 92 is made. Simultaneously, during the time the motor rotates in the forward direction, the up pulse is produced in response to the falling edge of the A phase output and the down pulse is produced in response to the rising edge thereof. Accordingly, if the lens reaches either limit position corresponding to the infinity condition or the nearest point and undergoes a hunting process to develop a back pulse, such back pulse can be counted in an accurate manner.

Figure 19:
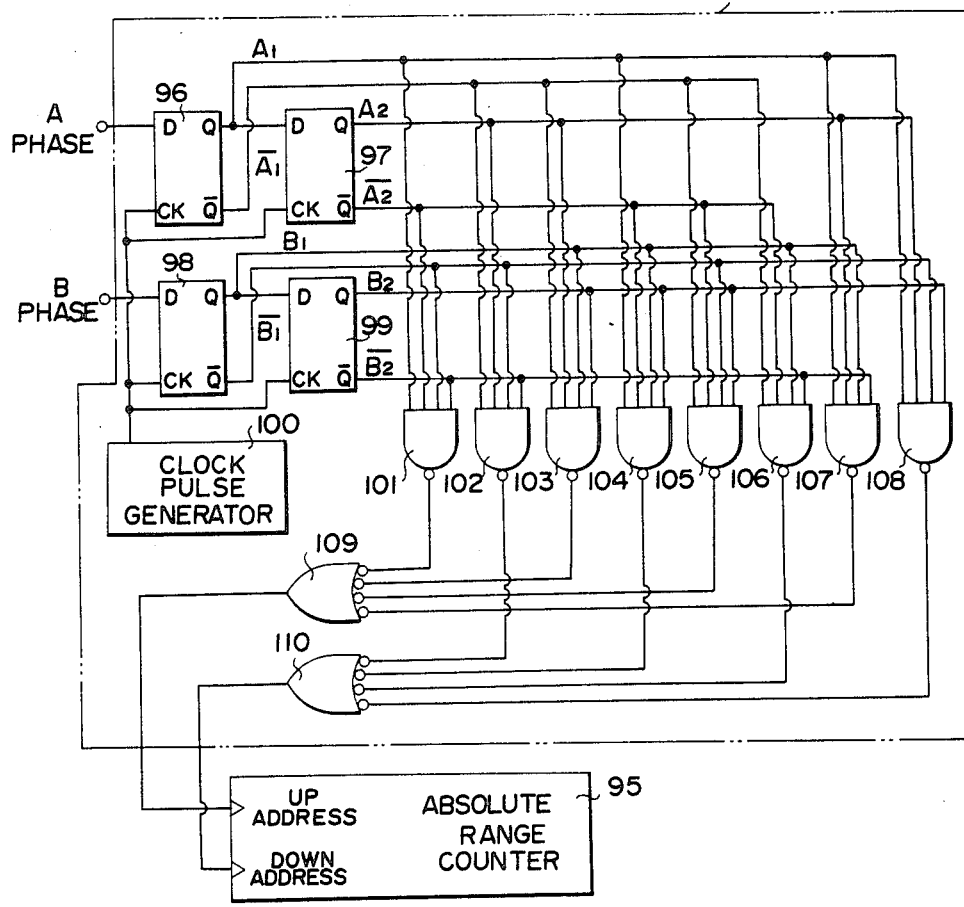
FIG. 19 is a circuit diagram of a further embodiment of a pulse discriminator circuit.

The embodiment shown in FIG. 14 utilizes both the rising and the falling edge of the A phase output $S_1$. However, FIG. 19 shows still another embodiment of pulse discriminator circuit 94 which utilizes the rising and the falling edge of both the A phase and the B phase to develop the up/down pulse which represents four times as much movement per address. The pulse discriminator 94 is adapted to be connected to the waveform shaper 72 which receives inputs from the lens travel detector 76 shown in FIG. 14 comprising the pair of photo-interrupters 74, 75 (see FIG. 15) which operate with a phase displacement of of 90° therebetween. It comprises D-type flipflops (hereafter abbreviated as D-FF) 96, 97 responsive to the A phase output and D-FF 98, 99 responsive to the B phase output from the waveform shaper 72, a clock pulse generator 100 which delivers a clock pulse to these flipflops 96 to 99, eight four-input NAND gates 101 to 108 which receive respective outputs $A_1$ (or $\overline{A}_1$), $A_2$ (or $\overline{A}_2$), $B_1$ (or $\overline{B}_1$), $B_2$ (or $\overline{B}_2$), and a pair of four-input OR gates 109, 110 connected between the output terminals of NAND gates and an up address input terminal and a down input address input terminal of an absolute distance counter 95. It will be noted that NAND gates 101 to 108 and OR gates 109, 110 are effective to form a pulse multiplier circuit which produces four multiple output.

Figure 20:
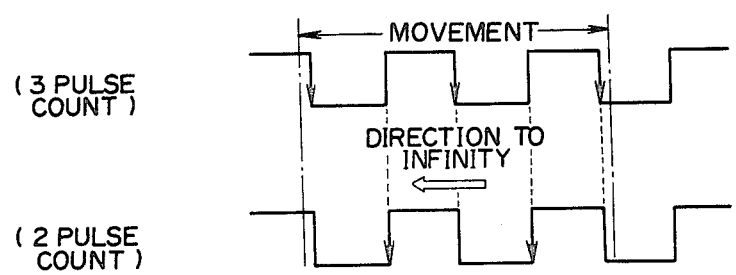
FIG. 20 is a series of timing charts illustrating a count error which occurs between the forward and the reverse rotation of the motor.

Referring to FIG. 19, when the motor 31 rotates in the forward direction or when the lens is driven toward the infinity condition, the combination of four NAND gates 101, 103, 105, 107 and OR gate 109 is effective to deliver an "H" pulse in response to the rising and the falling edge of both the A phase and the B phase, which is applied to the up address input terminal of the counter 95. The combination of the remaining four NAND gates 102, 104, 106, 108 and OR gate 110 is effective to apply "L" level to the down address input terminal of the counter 95. Accordingly, the counter 95 performs a count up operation having a resolution which is as high as four times that of the embodiment shown in FIG. 14. When the motor 31 rotates in the reverse direction or when the lens is driven toward the nearest point, the combination of NAND gates 102, 104, 106, 108 and OR gate 110 is effective to deliver an "H" pulse in response to the rising and the falling edge of both the A phase and the B phase, which is applied to the down address input terminal of the counter 95. The combination of the remaining NAND gates 101, 103, 105, 107 and OR gate 109 is effective to apply an "L" level to the up address input terminal of the counter 95. Again, the counter 95 performs a count down operation with four times as high resolution as the previous embodiments. Since the embodiment shown in FIG. 19 counts pulses with a higher resolution, not only a hunting phenomenon which occurs as the lens clings to the limit position corresponding to the infinity or nearest point can be compensated for, but also any small movement such as may be caused by a backlash of the drive gear may be fully compensated for by allowing a corresponding pulse count. It will be appreciated that in an arrangement in which a counting operation occurs in response to only the falling edge or the rising edge of the A phase as described in connection with the previous embodiment, when the direction of rotation of the motor is changed, the number of pulses produced for a common travel will have a maximum of one pulse count as an error, as illustrated in FIG. 20. However, with the present embodiment, such error can be reduced to $\frac{1}{4}$ or less thus enabling a highly precise counting operation.

In the described embodiments, even though the brightness of an object being photographed may be improved by the use of auxiliary illumination, where a taking lens greatly deviates, for example, to an infinity position or nearest point during the photometry, the contrast on the image plane will be degraded, thus preventing the photometry from being conducted despite the fact that auxiliary illumination is used. This disadvantage is improved by an embodiment of the invention which is described below. It is to be understood that in this embodiment, the electrical circuit of the apparatus for delivering distance information is constructed in a similar manner to that shown in FIGS. 2 and 3 and the programmed operation of the microcomputer which essentially deals with the AF block thereof takes place in a manner illustrated by the flowcharts of FIGS. 21 to 26. In the present embodiment, where the photometry is disabled despite the use of the auxiliary illumination, a lens travel is calculated on the basis of the absolute distance factors which are specific to a particular lens and the absolute magnitude of distance, and on the basis of the calculated lens travel, a position of a taking lens where the auxiliary illumination will be most effective is determined and the taking lens is moved to such position at which the auxiliary illumination is used again to effect the photometry.

Figure 21:
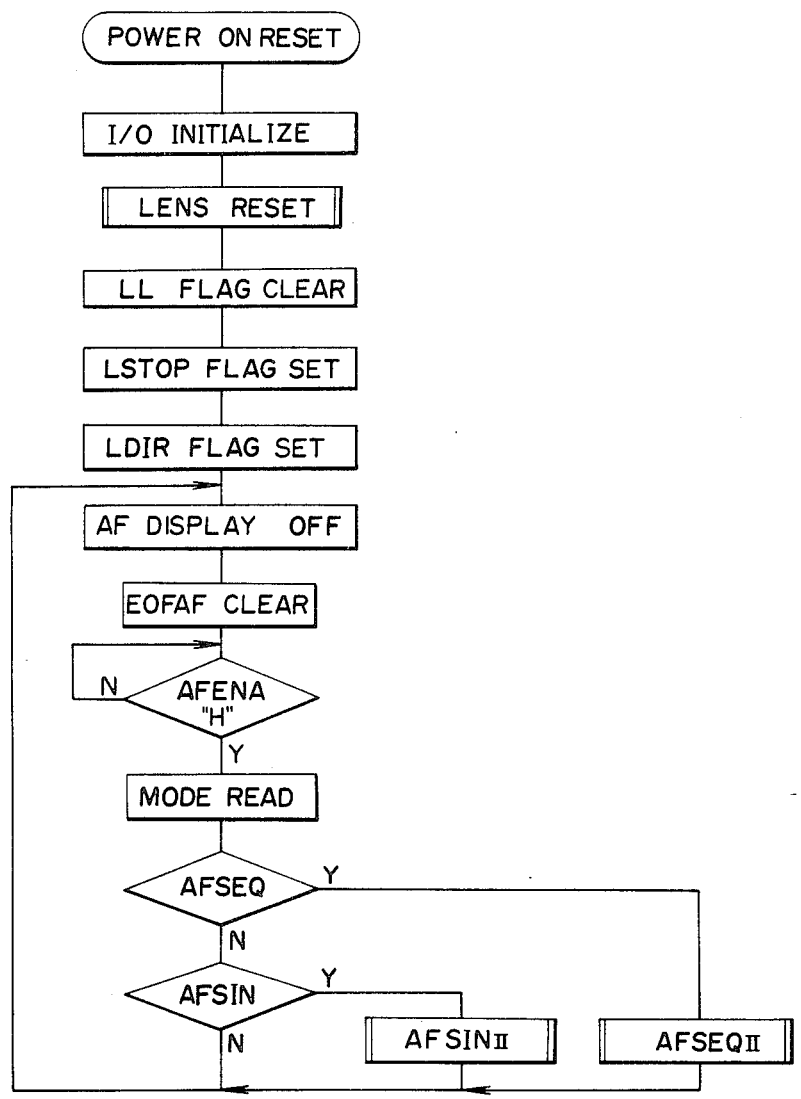
FIGS. 21 to 28 are flowcharts illustrating another program associated with the AF CPU shown in FIG. 2.

Referring to FIG. 21, the execution of the program is initiated by a power-on reset routine shown, followed by "I/O initialize" subroutine. The initialization takes place in a similar manner to that mentioned previously, and then "lens reset" subroutine is performed to clear the absolute distance counter. Subsequently, the LL flag is reset to "0" while the LSTOP flag and LDIR flag are set to "1". LSTOP flag is set to "1" when the distance ring of the lens is at infinity, and is reset to "0" when it is at the nearest point. The LDIR flag determines the direction of movement of the lens, and assumes "1" for a direction toward the infinity condition and assumes "0" for a direction toward the nearest point.

AF CPU 22 then turns AF display 24 off and clears EOFAF signal, thereafter waiting for the AFENA signal which is transmitted from the main CPU 14 to become active or to assume the "H" level. On the other hand, the main CPU delivers the photographing mode selected by a user on the mode line and then waits for the release button to be operated to its first step by a user. When the AFENA signal becomes active, the AF CPU 22 immediately proceeds to reading the mode line. It then selects and executes either AFSIN II or AFSEQ II subroutine depending on the results of reading according to AFSIN or AFSEQ subroutine.

Figure 22:
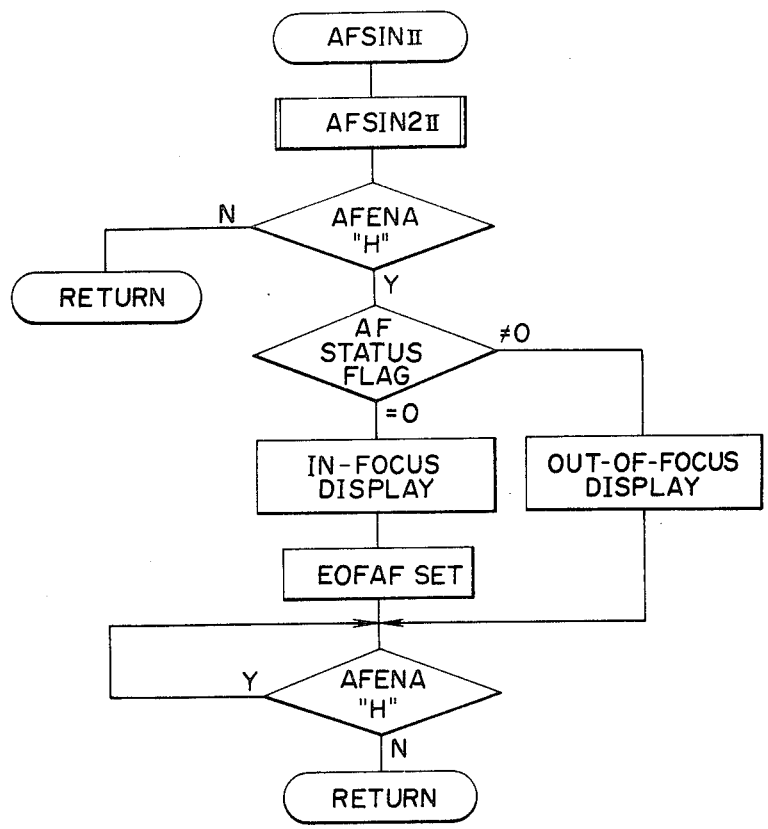

The operation in each individual lens drive mode will now be described with reference to the flowcharts shown in FIGS. 22 to 26. Initially, when AFSIN mode is selected, AFSIN II routine shown in FIG. 22 is executed. Specifically, "AFSIN 2 II" subroutine is called to examine AFENA signal. The remaining operations of the flowchart remains similar to that of AFSIN routine mentioned above in connection with FIG. 5. However, it should be noted that in the AFSIN 2 II subroutine shown in FIG. 22, the in-focus or out-of-focus condition, as a result of the AF operation in this subroutine is displayed by monitoring the AF status flag subsequent to the operation of the AFSIN 2 II subroutine. It is also to be noted that AF status flags include LC flag (low contrast), M flag (move), N flag (nearest point) described above, and also include an "over" flag (hereafter abbreviated as OV flag) which is set to "1" when the in-focus condition is not reached after trying to drive the lens eight times, for example. When all of these flags are "0", the in-focus condition can be reached while the in-focus condition cannot be reached if any one of these flags is set. When the in-focus condition is found, the EOFAF signal is produced to terminate the AF operation. When AFENA signal from the main CPU 14 becomes inactive or assumes "L" level, the program returns to a point where the AFENA signal is examined in the power-on/reset routine shown in FIG. 21.

Figure 23:
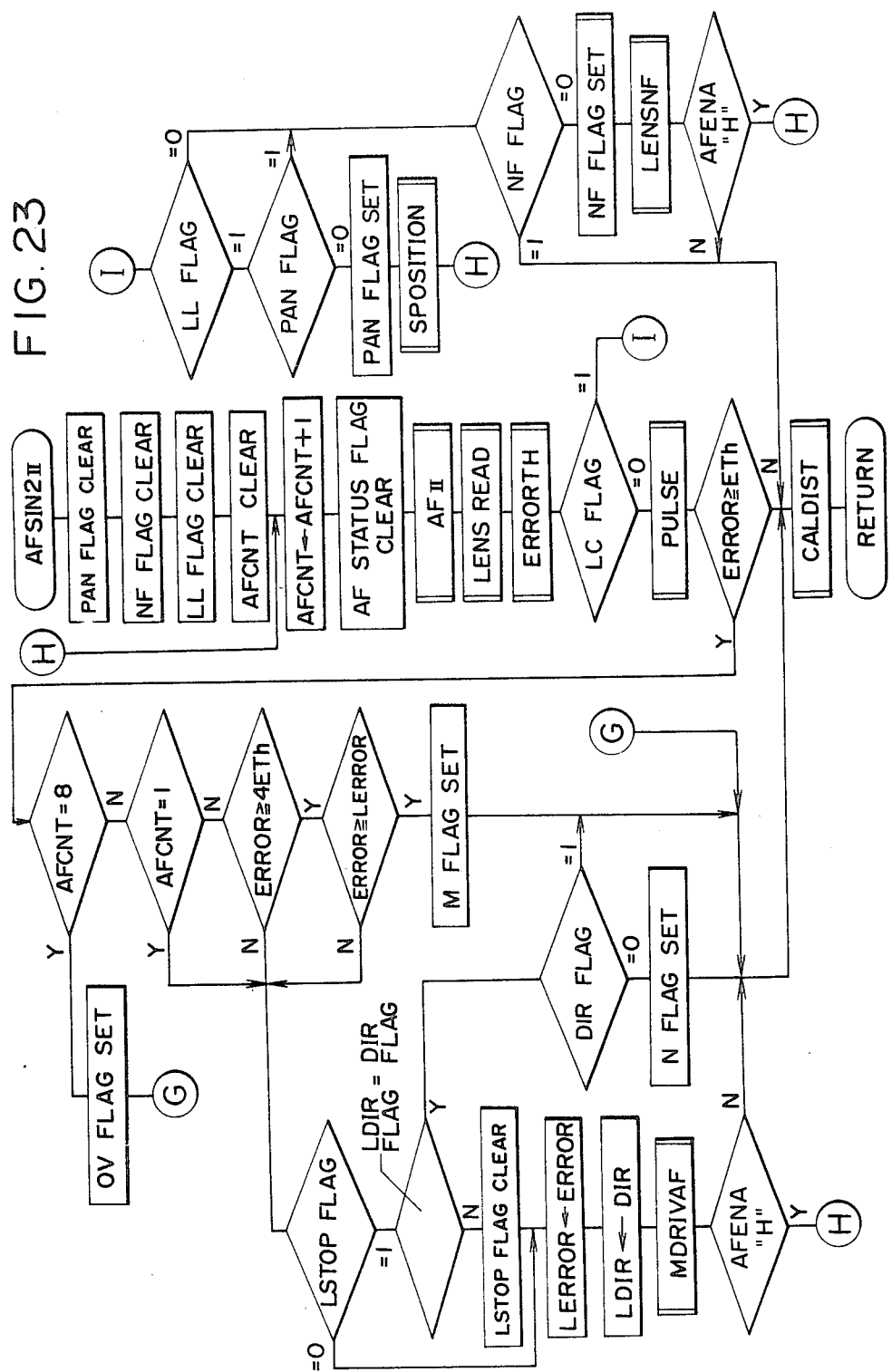
Figure 24:
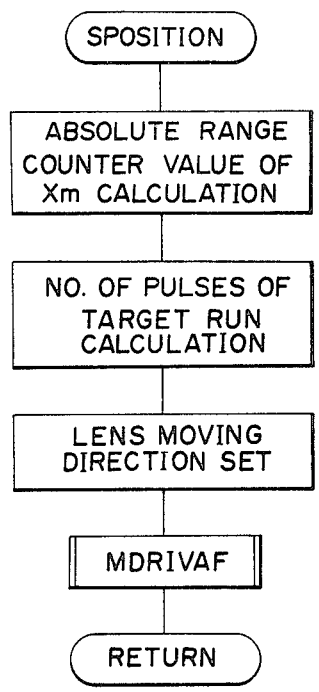

The programmed operation according to the AFSIN 2 II subroutine in the AFSIN II mode shown in FIG. 22 occurs in a manner illustrated in FIG. 23. Initially, PAN flag and NF flag, which control the AF operation, and the LL flag are cleared, as is a counter AFCNT which counts a number of passes of the AF operation (PAN and NF flags will be described later). AFCNT is then incremented by 1, starting the first pass of the AF operation. First of all, all the AF status flags are cleared, and the automatic focusing or "AF II" routine for the photometry is called. In the AF II routine, a distance to an object being photographed is detected and a calculation output value as a result of the AF operation (ERROR) is calculated, and DIR flag is set in a direction in which the lens is to be moved (namely, to "1" for a direction toward the infinity condition and to "0" for a direction toward the nearest point). However, if an object being photographed is under a low brightness level, the LL flag is set to "1" and the S lamp 27a is illuminated during the photometry. In the event an object being photographed exhibits low contrast, the LC flag is set to "1".

Subsequently, "LENS READ" routine is called, reading data stored in the lens data circuit 18 for each lens. Of such lens data read, information relating to an open FNo number is used to determine the AF accuracy threshold (ETh) in "ERROR TH" subroutine. The LC flag is examined. Unless the object being photographed exhibits a low contrast, the LC flag remains cleared, and hence if the LC flag is "0", the "PULSE" routine is called to calculate the required drive to be applied to the lens.

Subsequently, the calculation output value (ERROR) from the AF operation is compared against the AF accuracy threshold (ETh), and if the calculation output value is less than the threshold, an in-focus condition is determined, and the program proceeds to "CALDIST" subroutine. Otherwise, the program proceeds to examining AFCNT. If the count in AFCNT is equal to 8, this means that eight passes of the AF operation have already been performed, and a decision is rendered that a continued pass of AF operation cannot bring the lens into an in-focus condition, thus setting OV flag to "1". The program now passes through ⓖ — ⓖ to "CALDIST" subroutine. When the count in the AFCNT is not equal to 8, the counter is then examined to determine whether the count is equal to 1. If the count is equal to 1, the program proceeds to the examination of LSTOP flag. If this flag is set to "1", this means that the lens has reached its limit position, and then a comparison is made between LDIR flag which indicates the particular limit position where the lens has reached and DIR flag which indicates the direction in which the lens is to be moved. If these flags match, the program proceeds to the examination of DIR flag. If DIR flag is "1", this means that the direction of movement of the lens is in a direction beyond the limit position of the lens at the infinity side, and accordingly, a decision is rendered that the in-focus condition is reached, and the program proceeds to "CALDIST" subroutine. On the other hand, if DIR flag is "0", this means that an object being photographed is located at a position which is nearer than the nearest point of the lens. Accordingly, a decision is rendered that the out-of-focus condition prevails, and accordingly, N flag is set "1", and the program again proceeds to CALDIST subroutine. If a match is not found, LSTOP flag is cleared, and the calculation output value from the AF operation (ERROR) is transferred to the preceding ERROR storage register (LERROR), and DIR flag which indicates the direction of movement is also transferred to LDIR flag which indicates which side of the limit position the lens has reached.

Going back to the previous description, when LSTOP flag is not "1", the program again proceeds to setting LERROR and LDIR flag. "MDRIVAF" routine is then called, causing the lens to be moved in a direction indicated by the DIR flag and by an amount corresponding to the number of pulses which is derived by the "PULSE" routine. If the lens reaches either limit position during such movement of the lens, the lens drive motor 31 is deenergized, the LSTOP flag is set to "1" and the program returns. It is to be noted that AFENA signal is examined as required during the execution of "MDRIVAF" routine. Accordingly, if the user has ceased to operate the release button to its first step during the time the lens is being driven, the main CPU 14 changes the AFENA signal from its "H" to its "L" level, and upon detecting an AFENA signal of "L" level, AF CPU 22 immediately ceases the lens drive, and the program returns. After returning, the AFENA signal is initially examined, and if it is at its "L" level, the program proceeds to the CALDIST subroutine. If the signal is at its "H" level, the program exits through Ⓗ to initiate a second pass of the AF operation.

During a second and subsequent pass, the AF operation remains similar as during the first pass. However, during the decision to see if AFCNT is equal to 1, an examination is made to see if the calculation output value from the AF operation (ERROR) is equal to or greater than four times the AF accuracy threshold (ETh) since AFCNT≠1. If the calculation output value is less than the threshold, the program proceeds to the examination of LSTOP flag in a similar manner to the first pass. If the calculation output value is equal to or greater than four times the threshold, the present calculation output value (ERROR) is compared against the preceding calculation output value (LERROR), and the program proceeds to the examination of LSTOP flag in a similar manner as in the first pass unless ERROR≧LERROR. If ERROR≧LERROR, M flag is set to "1" and the program proceeds to CALDIST subroutine. This is because a continued AF operation is wasteful inasmuch as the calculation output value from the AF operation which greatly exceeds the preceding value under the condition that the deviation of the lens from the in-focus position is as much as four times the threshold or greater implies that an object being photographed is moving at a high speed.

A situation will now be considered that the LC flag is set to "1" during AF II routine because of the low contrast which an object being photographed exhibits. "LENS READ" and "ERRORTH" routines are executed as before, but if the examination of LC flag indicates that it is equal to "1", the program exits through Ⓘ and proceeds to the examination of LL flag. If an object being photographed is not under low brightness and LL flag is equal to "0", the program proceeds to LENSNF subroutine while if an object being photographed is under a low brightness and LL flag is equal to "1" (corresponding to the use of the auxiliary illumination S lamp 27a), the program proceeds to the examination of PAN flag. PAN flag represents a control flag which is initially cleared during AFSIN 2 II routine, and is set to "1" immediately before "SPOSITION" routine. Unless PAN flag is equal to "1", this flag is set to "1", followed by calling the "SPOSITION" routine. This routine will be described with reference to FIG. 24.

The purpose of "SPOSITION" routine is to move the taking lens to a position where the probability of enabling the photometry is most high when the S lamp 27a is used as auxiliary illumination. It is assumed that such position is equal to an absolute distance of x m. Initially, the absolute distance factors a and b which are read during the LENS READ routine are used to calculate the value in the absolute distance counter which occurs at the position of x m. This value is compared against the value in the absolute distance counter at the present position of the taking lens, thus deriving a number of move pulses from the present position to a target position and the direction of movement of the lens therefor. Then the taking lens is moved to the position where the auxiliary illumination is most effective in the MDRIVAF routine, and the program then returns. After return, the program enters the second pass of the AF operation through Ⓗ.

If an object being photographed exhibits a low contrast when the lens is located at x m position, the program proceeds to the examination of LL flag and PAN flag as before, but since PAN flag is already set to "1" now, the program then proceeds to the examination of NF flag. NF flag represents a control flag which is effective to perform a single execution of "LENSNF" routine, and is cleared at the beginning of "AFSIN 2 II" routine and is set immediately before "LENSNF" routine. If NF flag is not "1", it is set to "1", and then "LENSNF" routine is called. In the LENSNF routine, the lens is once fed forward to the nearest position and then retracted to the infinity position, thereby allowing the inability to reach the in-focus condition to be positively informed to a user through a movement of the lens through an increased stroke, as mentioned previously. It is to be understood however that the low contrast condition of an object being photographed is always monitored during the movement of the lens so that the movement can be immediately ceased whenever a low contrast condition of the object ceases to prevail, and then the program returns. The movement also ceases and the program returns whenever AFENA signal changes from its "H" to "L" level. When the lens reaches the limit position corresponding to the infinity position and remains thereat, the absolute distance counter which saves the number of move address signals from the infinity position of the distance ring of the lens is reset, and LSTOP flag is set to "1".

The LENSNF routine is followed by the examination of AFENA signal, and if it is not at its "H" level, the program proceeds to the CALDIST subroutine. If the signal is at its "H" level, the program again returns through Ⓗ to initiate the normal AF operation. However, if an object being photographed exhibits a low contrast at this time, the program proceeds to the examination of LL flag, PAN flag, followed by the examination of NF flag, but since NF flag has already been set to "1", the program proceeds to CALDIST routine without repeated execution of LENSNF routine.

AFSIN 2 II routine is completed now, and the program returns to AFSIN II routine.

Figure 25:
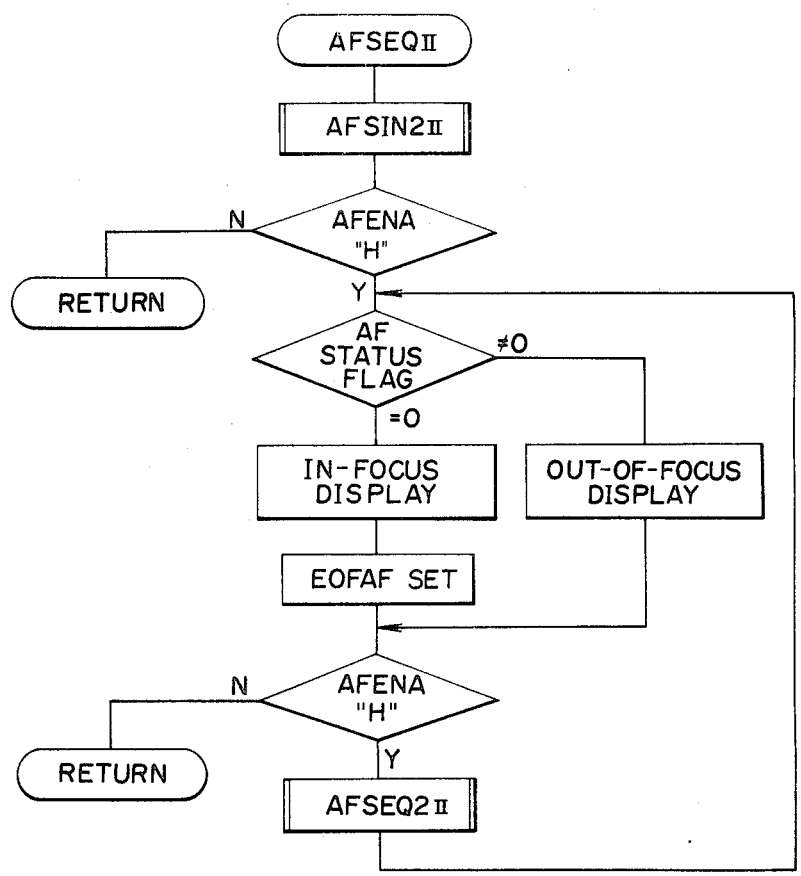

Returning to the flowchart shown in FIG. 21, when AFSEQ mode is selected, "AFSEQ II" routine shown in FIG. 25 is called. In AFSEQ II routine, when the release button has been operated to its first step, the AF operation during the first pass until EOFAF becomes active remains quite the same the AFSIN II routine shown in FIG. 22. Thus in both AFSIN II and AFSEQ II routines, the operation according to the AFSIN 2 II subroutine takes place, informing the user of the inability to reach the in-focus condition through a positive lens drive through an abnormal stroke, as in the first embodiment.

When the S lamp 27a is used as under a low light condition during the AF operation in the AFSEQ II routine, the S lamp 27a will be illuminated continuously during the time duration of CCD integration which occurs in the AF II routine. Accordingly, in the AFSEQ II routine, after a single pass of the AF operation has been executed to set the EOFAF signal, the AFENA signal is examined, and if it is active, a decision is rendered that the operation of the release button to its first step has been maintained, thus calling the "AFSEQ 2 II" routine. If the AFENA signal is inactive, it is determined that the operation of the release button its first step has been interrupted or its operation to a second step has been made, and the program then returns. In the AFSEQ II routine, CCD integration of the in-focus sensor 20, the calculation by the AF operation and the lens drive take place, but there occurs no positive indication of inability to reach the in-focus condition through an abnormal drive of the lens nor illumination of the S lamp 27a for purpose of the photometry. The AF status flags as a result of the operation according to the AFSEQ 2 II routine are examined, and if these flags are "0", the in-focus OK is displayed. If these flags are not "0", the inability to reach the in-focus condition is displayed. Subsequent to the display of the in-focus OK, the EOFAF signal is produced, enabling the exposure sequence to be initiated in response to the operation of the release button to its second step. After the EOFAF signal has been produced or the inability to reach the in-focus condition has been displayed, the program again examines the AFENA signal. Accordingly, as long as the operation of the release button to its first step is maintained, the AF operation around the AFSEQ 2 II routine occurs continuously. When the AFENA signal becomes inactive, the program returns to the flowchart for the power-on/reset routine shown in FIG. 21.

Figure 26:
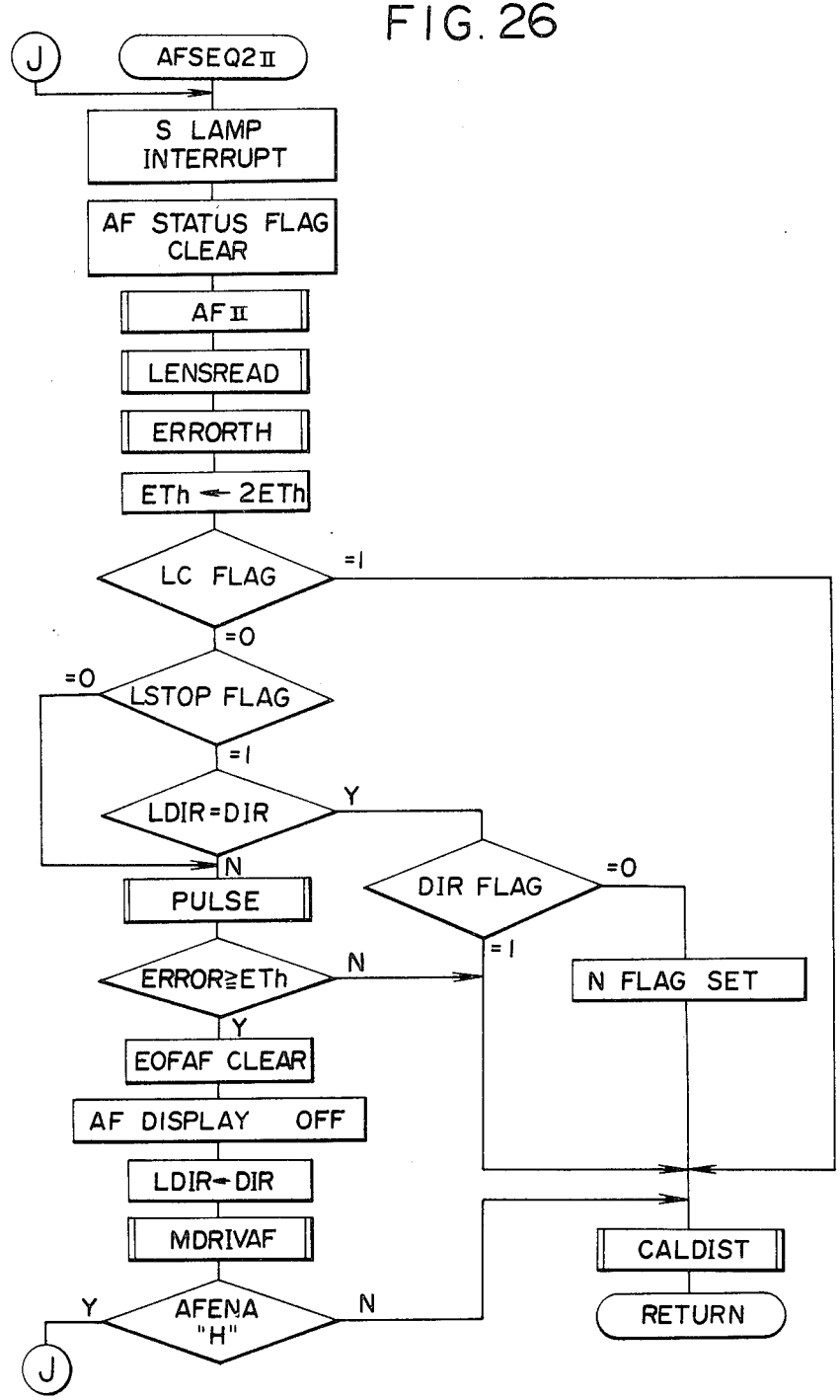

In the flowchart for the AFSEQ II routine shown in FIG. 25, the programmed operation of the AFSEQ 2 II subroutine takes place in a manner indicated in FIG. 26. Specifically, in the AFSEQ II routine, whenever EOFAF signal has once been set, the S lamp 27a will not be illuminated during the subsequent photometry. To this end, at the outset of the AFSEQ 2 II routine, the use of the S lamp 27a is inhibited and the AF status flags are cleared. Subsequently, the calculation output value from the AF operation (ERROR) is calculated according to the AF II routine, and the direction of movement of the lens is set in DIR flag. However, it is to be noted that the S lamp 27a is not illuminated even if an object being photographed is under a low brightness level.

Then follows "LENS READ" routine where data stored in the lens data circuit 18 is read for each lens, and the AF accuracy threshold (ETh) is determined in the following "ERRORTH" routine. The AF accuracy threshold (ETh) is then doubled. The reason herefore is that since the in-focus condition is reached during the AFSIN 2 II routine, it is assured in the AFSEQ 2 II routine that a movement of the taking lens in a range on the order of twice the AF accuracy threshold (ETh) in response to a slight movement of an object being photographed cannot cause the release to be inhibited.

The LC flag is then examined, and if it is "1" (incapable of performing the photometry due to the low contrast), the program proceeds to the CALDIST subroutine without driving the lens. If the LC flag is "0", the program proceeds to the examination of the LSTOP flag, and if this flag is "1", indicating that the lens has reached either the infinity position or the nearest point, LDIR flag which indicates either side the lens has reached is compared against DIR flag which indicates the direction in which the lens is to be moved, and if they do not match, the program proceeds to "PULSE" routine. However, if they match, the program proceeds to the examination of DIR flag. When DIR flag is "1", this means that the direction in which the lens is to be moved is in a direction going beyond the infinity position, and accordingly, a decision is rendered that the in-focus condition is reached and the program proceeds to CALDIST subroutine. On the other hand, if DIR flag is "0", this means that an object being photographed is located at a location nearer than the nearest point of the lens, and accordingly a decision is rendered in this instance that the out-of-focus condition prevails. N flag is set to "1" and the program proceeds to CALDIST subroutine.

When LSTOP flag is not "1", after the number of move pulses to the target has been calculated in the "PULSE" routine, the calculation output value from the AF operation (ERROR) is compared against the doubled value of the AF accuracy threshold (ETh), and unless ERROR≧ETh, a decision is rendered that the camera is in its in-focus region, and the program returns after executing CALDIST routine. If the inequality ERROR≧ETh applies, EOFAF signal is cleared, informing the main CPU 14 that the camera is in the out-of-focus region. The in-focus OK displaying LED 24a and inability to reach the in-focus displaying LED 24b are turned off, and the content of DIR flag which indicates the direction of movement of the lens is transferred to LDIR flag which contains the preceding direction of movement. The "MDRIVAF" routine is then called, and the lens is driven in a direction indicated by DIR flag and by an amount corresponding to the number of pulses which has been calculated in "PULSE" routine. After returning from the "MDRIVAF" routine, the AFENA signal is examined, and if it is at its "H" level, the program returns through Ⓙ to repeat the same operation. If it is not at its "H" level, the program executes the CALDIST subroutine, and then returns.

In the embodiment shown in FIGS. 21 to 26, it is also possible to determine the absolute magnitude of distance by determining the absolute distance factors a and b which are specific to each lens and storing it in the lens data circuit 18 to derive the lens travel (the content of the absolute distance counter) in accordance with either equation (4) or (5). Accordingly, if it is found that the auxiliary illumination will be most effective when the taking lens be disposed at an absolute distance of x m, it is possible to determine the travel y of the taking lens until the target position is reached according to the equation (4). In this embodiment, where an object being photographed is under a low brightness level, the auxiliary illumination is once used at the present position of the taking lens where it is at rest to perform the photometry, and if it is found that the photometry is impossible, the taking lens is moved to a position where the auxiliary illumination is most effective. However, it should be understood that if it is known beforehand that the photometry during the first pass is impossible, for example, if the taking lens is greatly offset from the position where the auxiliary illumination is effective, the taking lens may be directly moved to the position where the auxiliary illumination is most effective without performing a photometry at the present position of the taking lens.

In an automatic focusing camera of known form which is provided with a passive photometric unit which detects the distance to an object being photographed using reflected light from an object being photographed, the detection of the distance is disabled when an object being photographed exhibits a low contrast. Accordingly, a number of techniques have been proposed which enable a taking lens to be forcibly moved to a normal focal position whenever an object being photographed exhibits the low contrast. However, when it is attempted to utilize such technique to an AF camera of interchangeable lens type, a uniform normal focal position cannot be determined since such normal focal position differs with lenses having different focal lengths, thus preventing the utilization of such technique.

Figure 27:
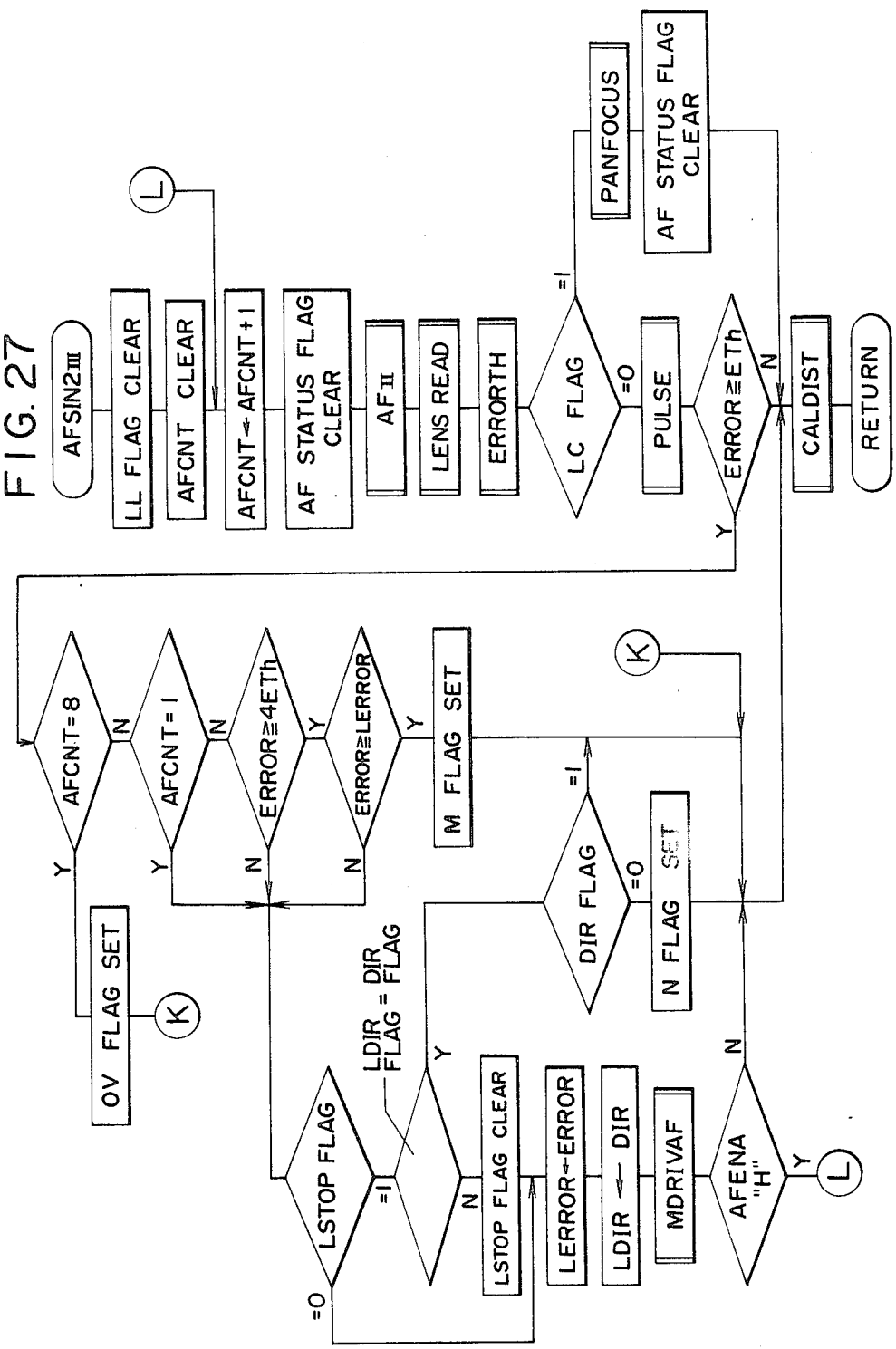
Figure 28:
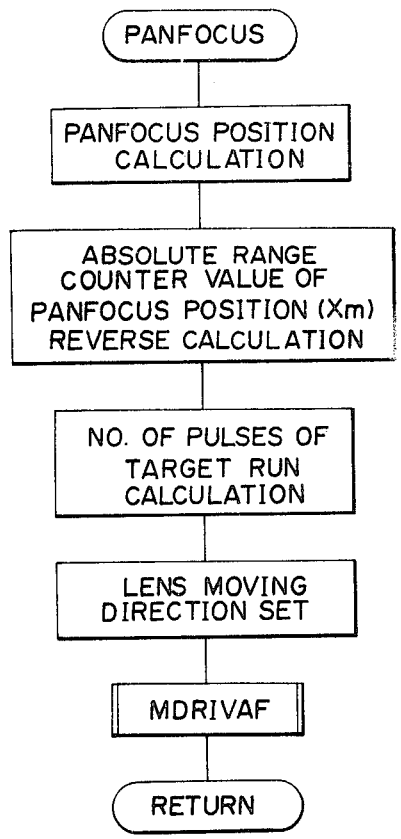

In an yet another embodiment of the invention, where an object being photographed exhibits a low contrast, the focal length of a taking lens is read, and based on the focal length read and an absolute distance, a normal focal position of the taking lens or a position where a focusing condition is most extensive is determined, and the taking lens is moved to such position before enabling the release. In an apparatus for delivering distance information according to such embodiment, the microcomputer which principally deals with the AF block operates according to the flowcharts shown in FIGS. 21 to 26 except that the flowchart for the AFSIN 2 II routine shown in FIG. 23 is modified to that shown in FIGS. 27 and 28.

Thus when AFSIN mode or AFSEQ mode is selected in the main routine shown in FIG. 21, AFSIN 2 II subroutine is initially called in the AFSIN II routine shown in FIG. 22 or AFSEQ II routine shown in FIG. 25. However, in the present embodiment, the AFSIN 2 II subroutine is replaced by the "AFSIN 2 III" subroutine shown in FIG. 27. The operation in this subroutine takes place as follows: Initially, LL flag which controls the AF operation is cleared, as is the counter AFCNT which counts the number of passes of the AF operation. The counter AFCNT is then incremented by 1, starting the first pass of the AF operation. Initially, all the AF status flags are cleared, and the automatic focusing "AF II" routine is called for the purpose of photometry. In the AF II routine, the distance to an object being photographed is detected and the calculation output value from the AF operation (ERROR) is calculated in a manner mentioned previously, and the direction in which the lens to be moved is set into DIR flag (to "1" for a direction toward the infinity condition and to "0" for a direction toward the nearest point). However, if an object being photographed is under a low brightness level when the photometry is to be conducted, LL flag is set to "1" and the photometry is undertaken while illuminating the S lamp 27a. In addition, if an object being photographed exhibits a low contrast, LC flag is set to "1".

Subsequently, "LENS READ" routine is read, thus reading data stored in the lens data circuit 18 for its lens. Of such data, information relating to an open FNo of the lens is used to determine the AF accuracy threshold (ETh) in the ERRORTH subroutine. LC flag is then examined. Unless an object being photographed exhibits a low contrast, the LC flag remains cleared, and accordingly, when the LC flag is "0", the operation takes place according to the program which begins with "PULSE" routine. Such operation has been mentioned previously for AFSIN 2 II routine in connection with FIG. 23, and therefore, will not be described.

When an object being photographed exhibits a low contrast and the LC flag is set to "1" in the AF II routine, "LENS READ" and "ERRORTH" routines are executed as before, but if LC flag is found to be "1" during the examination thereof, the "PANFOCUS" routine is called. In this routine, the taking lens is moved to a normal focal position which is dependent on the focal length of a particular taking lens. This subroutine will be described with reference to FIG. 28.

Initially, utilizing focal length information of a taking lens which is obtained from the lens data circuit 18 in the "LENS READ" routine, a normal focal position or a position where the focusing is most extensive (hereafter such position will be referred to as a "panfocus" position) is determined from a conversion table contained in the internal ROM of AF CPU 22 for a particular focal length. Assume that the panfocus position is at x m. A value in the absolute distance counter which will be reached when the taking lens is moved to the position x m is then calculated. The value in the absolute distance counter at the present position of the taking lens is then compared against the value in the absolute distance counter which will occur at the panfocus position, thus calculating a number of move pulses to the target position. The direction of movement of the lens is then set and "MDRIVAF" routine is called, moving the taking lens to the panfocus position. The program then returns.

Returning to FIG. 27, upon returning from the "PANFOCUS" routine, the AF status flags are cleared, and the program proceeds to CALDIST subroutine in order to provide a pseudo in-focus condition at the panfocus position. Accordingly, this terminates the CALDIST routine, and the in-focus display is given upon returning to the AFSIN II routine shown in FIG. 22 or to the AFSEQ II routine shown in FIG. 23.

In the embodiment incorporating the AFSIN 2 III subroutine, focal length information is read from the lens data circuit 18, and is used to obtain the panfocus position from the conversion table stored in the internal ROM within AF CPU 22. However, alternative techniques may be employed with equal effects, including the calculation of the panfocus position as a function of the focal length or the storage of the panfocus position information within the lens data circuit 18. It will be seen that when the release is enabled by providing a pseudo in-focus position at the panfocus condition, the focusing range will be greater with a reduced diaphragm aperture. Accordingly, the diaphragm may be controlled to provide as small an aperture as possible while reducing the shutter speed sufficiently to prevent a hand blurring only when the pseudo in-focus condition at the panfocus position is maintained.

The described embodiments of the invention have been applied to a camera of interchangeable lens type, but it should be understood that the invention is equally applicable to a fixed lens camera. In addition, the invention permits an open loop control system to be constructed which py applicable to a fixed lens camera. In addition, the invention permits an open loop control system to be constructed which provides a one-to-one correspondence between a drive signal and an amount of drive transmitted, thus dispensing with a feedback loop.

Figure 29:
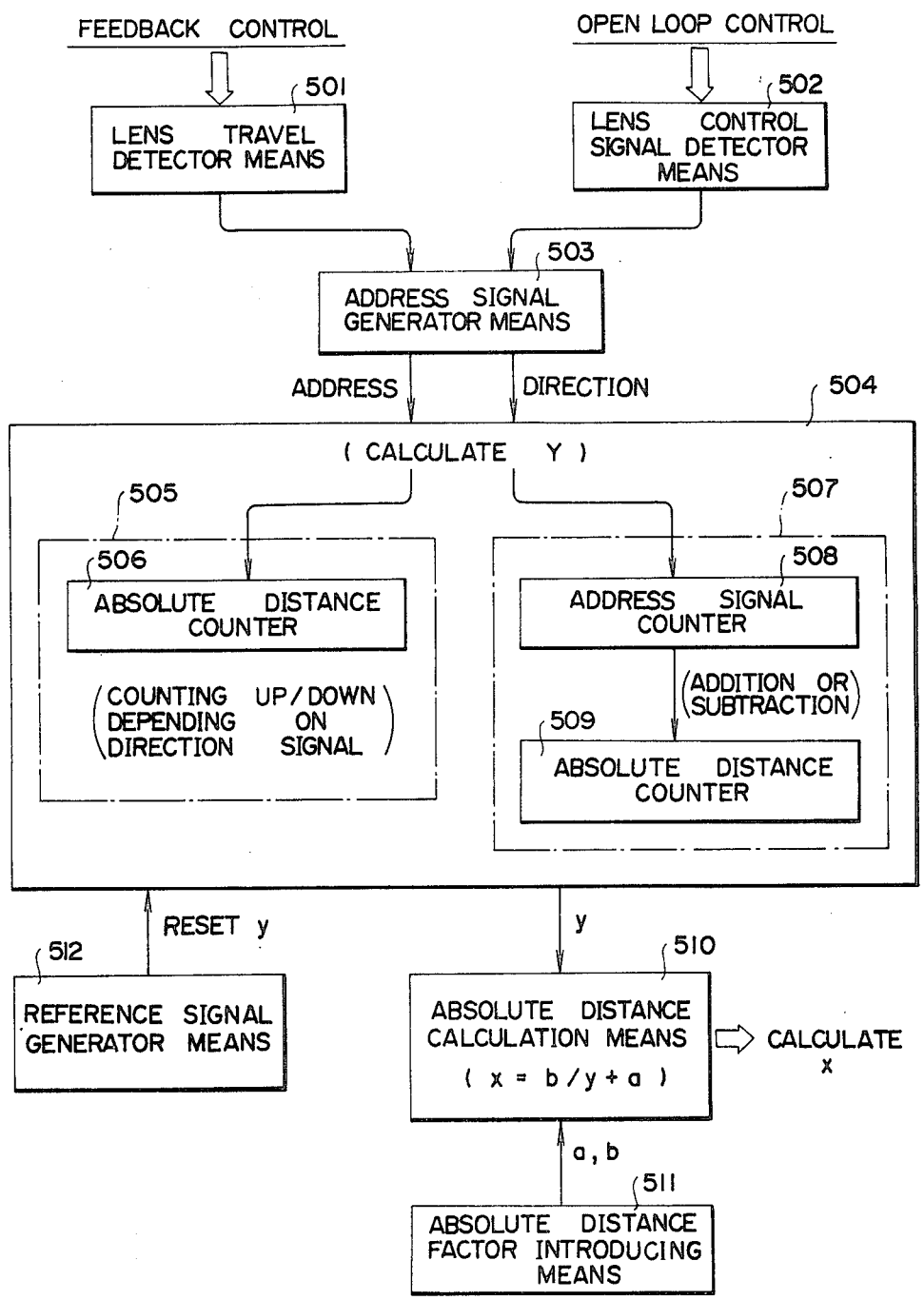
FIG. 29 is a block diagram of an absolute distance calculating system of the apparatus according to the invention.

FIG. 29 is an overall block diagram of a system for calculating the absolute magnitude of distance which forms part of an apparatus for delivering distance information according to the invention. As will be appreciated, the main objective of the invention is to provide an absolute distance x, which is derived by absolute distance calculation means 510 according to the formula $x = b/y + a$ where a and b are absolute distance factors which are specific to each particular taking lens used. These factors are applied to the calculation means 510 through absolute distance introduction means 511. For a camera of interchangeable lens type, it is efficient that the factors a and b be stored in an ROM which is specific to each particular lens or similar storage element so that their values can be read through the camera body for use in the calculation of the absolute distance. For a fixed lens camera, the camera body may obviously be provided with such factors a and b. For a camera of interchangeable lens type, a plurality of values for the factors a and b may be provided within the camera body so that a particular combination of (a, b) can be selected in response to an identification code of a particular lens used. However, this is not an efficient use. Considering a representation of the factors a and b in terms of integers, the factor a will be an integer equal to or greater than 0 if an error in absolute distance is to be suppressed and may also assume a negative value when the backlash of the drive system is taken into consideration, while the factor b is a positive integer excluding zero.

Figure 30:
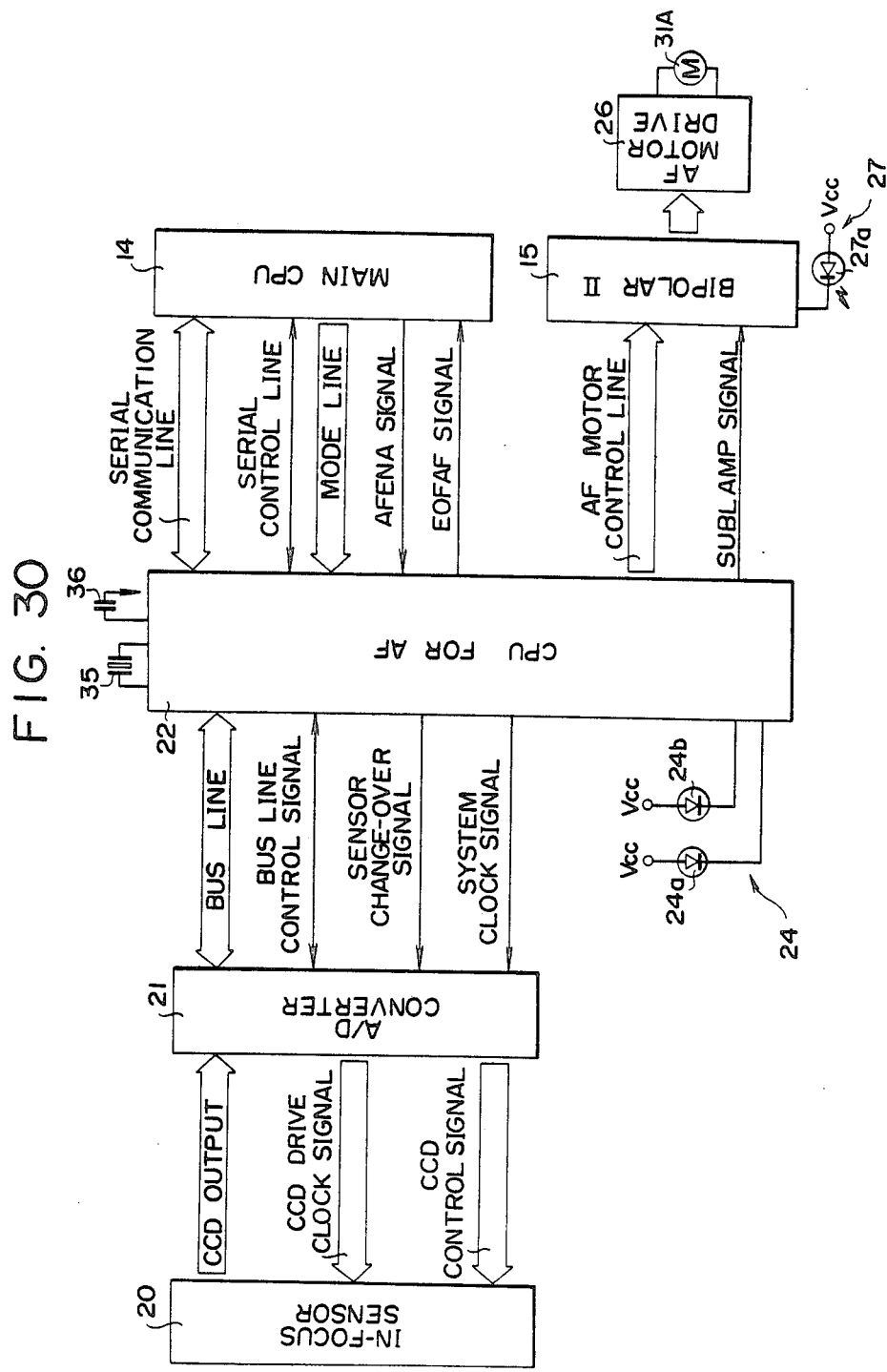
FIG. 30 is a block diagram similar to FIG. 3 of an embodiment in which a lens is driven by an open loop control.
Figure 31:
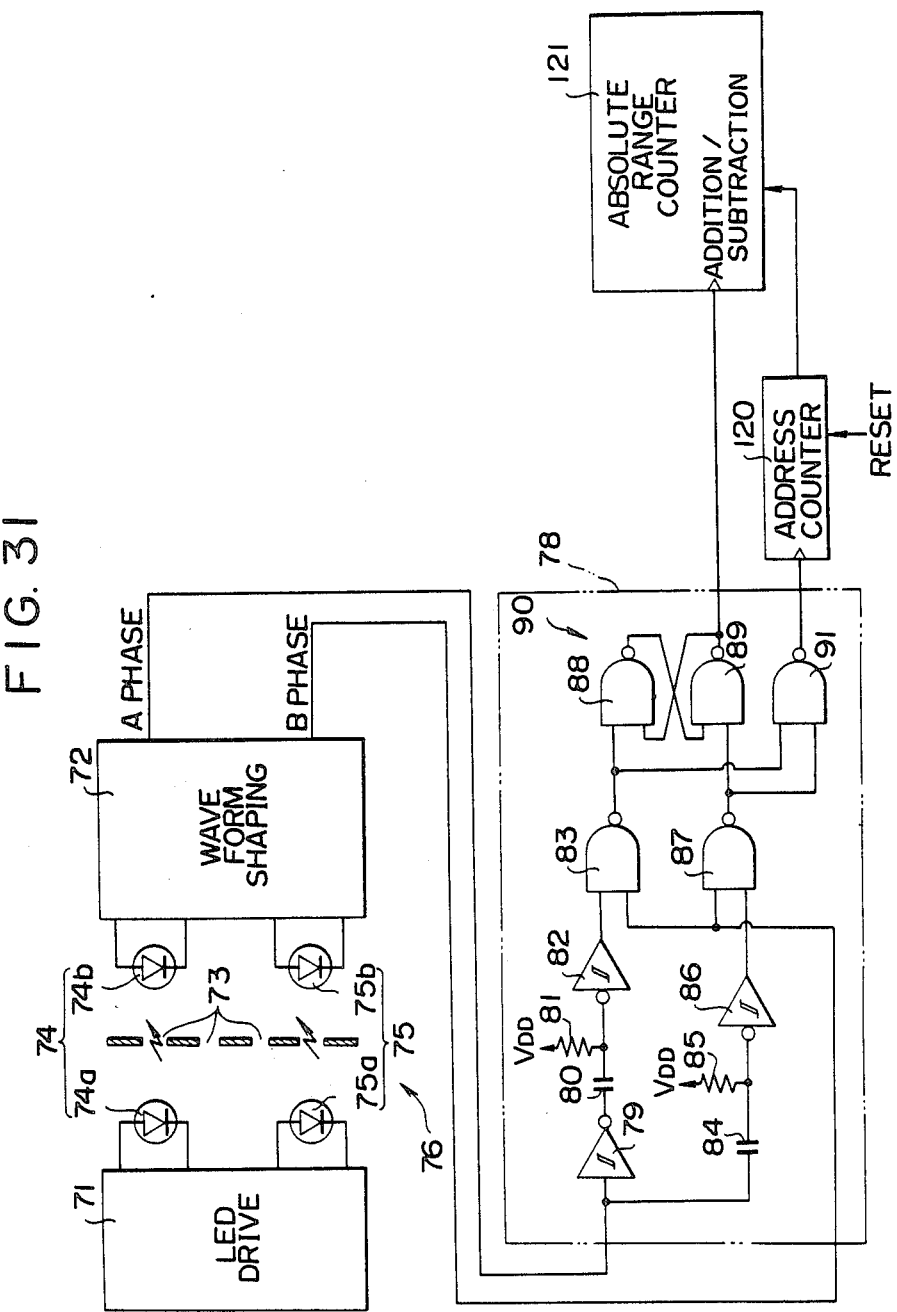
FIG. 31 is a circuit diagram similar to FIG. 14 of a further embodiment of counter means which is used in the present invention.

Considering the number of pulses from a reference position or the lens travel y, an optimum reference position will be an infinity position or a nearest point as mentioned in connection with the embodiments. At the reference position, y in counter means 504 is reset by a reference signal generator means 512 when the lens resetting operation takes place. A relative distance is subsequently counted by the counter means 504. In the embodiment shown in FIG. 3, the photo-interrupter 33 is used to provide a feedback loop for the lens drive, but the lens travel detector means 501 may alternatively comprise other elements such as a photo-reflector, Hall element or mechanical switch. In such instance, a feedback loop control is used for the lens drive system, and a count of relative distance is calculated by an absolute distance counter within the counter means 504 as y while monitoring the lens drive subsequent to the movement in terms of an output from the pulse signal generator means 503.

Where an open loop control is used for the lens drive, a lens drive motor 31A comprises a motor such as a stepping motor or ultrasonic motor which lends itself to an open loop control. The motor 31A is driven in accordance with a lens travel controlling signal which is based on an offset from a point in focus, and the lens travel control signal itself is supplied to address signal generator means 503 through lens travel control signal detecting means 502 so that a travel y can be derived by inputting the relative distance to the counter means 504. It will be apparent in this instance from a comparison between FIGS. 3 and 30 that the use of the lens drive motor 31A which is susceptible to an open loop control, a drive monitor 34 (see FIG. 3) comprising the photo-interrupter 33 contained in the address signal generator means 503 may be omitted. Accordingly, an address signal from the bipolar II circuit 15 need not be supplied to the AF CPU 22, thus allowing the line associated with the address signal to be omitted. Specifically, the address signal and the detection signal from the address signal generator means 503 can be processed within the AF CPU 22.

Where the address signal generator means 503 includes a drive monitor or where the lens drive must be achieved through a feedback loop control, and if a single phase pulse control is employed (see FIG. 13), it is necessary to distinguish the direction for a drive signal, as by determining that a drive signal toward the infinity position as well as the pulse input signal which follows during a braking interval or motor deenergization interval be indicative of a drive signal toward the infinity position while determining that a drive signal toward the nearest point and a pulse input signal during a braking interval or motor deenergization interval which follows be a drive signal toward the nearest point.

Where the control employs pulses of two or more phases (see FIGS. 14 and 19), the detection signal is available from the pulse discriminator means. Also means which improves the resolution can be implemented as indicated in FIG. 19. When input means which receive pulses of two or more phases is used, an absolute distance counter may comprise two blocks shown in phantom lines 505, 507 illustrated within the counter means 504 in FIG. 29. For example, a single absolute distance counter 505 (92) may be used as shown in FIG. 14 to switch it between a count-up and a count-down operation in accordance with a detection signal. However, instead of using such absolute distance counter, a combination of an address counter 508 (120) and an absolute distance counter 509 (121) may be used as shown in FIG. 31. In the embodiment shown in FIG. 31, an address counter 120 is reset at the time a drive signal is produced, thus enabling a counting operation of address information by the address counter. Immediately before the drive mode is changed, the count in the address counter 120 is added with or subtracted from the content of the absolute distance counter 121 in response to a signal $S_9$ in the drive direction. For example, the addition is employed in a direction toward the nearest point while the subtraction is used for a direction toward the infinity position.

What is claimed is:

1. An apparatus for delivering distance information of a camera having a taking lens comprising:
   drive means for driving the taking lens;
   counter means;
   reset means for resetting the counter means when the taking lens has reached a reference position;
   memory means for storing data which is specific to each particular taking lens and which is used in the conversion of a count in the counter means into an absolute distance; and
   calculation means for calculating an absolute distance on the basis of the specific data and the count by inputting the count upon termination of driving of the taking glens by said drive means.

2. An apparatus according to claim 1 further comprising address signal generator means, in which said counter means is a counter for counting an address signal produced by said address signal generator means for developing a relative address signal representing an amount of movement of the lens drive means from a predetermined position.

3. An apparatus according to claim 2 in which said taking lens includes a lens barrel movable and a member, said address signal generator means developing an address signal by detecting a movement of said movable member which is mechanically interlocked with said lens barrel that is driven by the lens drive means.

4. An apparatus according to claim 2 in which said counter comprises an absolute distance up/down counter, and pulse discriminator means which distinguishes the direction of movement of the lens drive means to switch the operation of the absolute distance counter between a count-up and a count-down operation.

5. A apparatus according to claim 2 further comprising pulse discrimination means and an address counter, said counter comprising an absolute distance up/down counter which effects an addition or subtraction to a count value counted by said address counter in accordance with the direction signal produced by said pulse discriminator means.

6. An apparatus according to claim 4 in which the pulse discriminator means determines the direction of movement of the lens drive means in response to a control signal applied to the lens drive motor, thereby switching the absolute distance counter between a count-up and a count-down operation or switching it between addition and subtraction, the pulse discriminator means producing a count pulse at at least one of the rising and the falling edges of the address signal developed by a lens travel detector in accordance with the control signal.

7. An apparatus according to claim 4 further comprising a lens travel detector for generating a first and a second address signal which have a phase difference therebetween, the phase difference depending on the direction of movement of the lens drive means, whereby the pulse discriminator means is able to switch the absolute distance counter between a count-up and a count-down operation or between addition and subtraction, the pulse discriminator means producing a count pulse at at least one of the rising and the falling edges of the address signal.

8. An apparatus according to claim 4 in which the pulse discriminator means determines an address signal which is produced during the time a signal depending on the direction of movement of the lens drive motor is being delivered or during a motor braking interval, inclusive of a deenergization interval of said lens drive means, which follows the first mentioned interval, as representing the direction of movement of the lens drive means, and delivers it to the absolute distance counter.

9. An apparatus according to claim 7 in which the pulse discriminator means includes means to produce a count pulse for up-count or down-count at each of the rising and the falling edges of the two address signals.

10. An apparatus according to claim 7 in which the pulse discriminator means includes a clock pulse input means and a pulse multiplier means, thereby enhancing the resolution of the address signal.

11. An apparatus according to claim 1 in which the counter means counts an address signal from address signal generator means which develops a relative address signal representing an amount of movement from a reference position which depends on the taking lens controlling signal.

12. An apparatus according to claim 11 in which the address signal generator means detects a lens control signal on the basis of an offset from a point in focus and develops the address signal.

13. An apparatus according to claim 11 in which the counter means comprises an absolute distance counter, the operation of which is switched between a count-up and a count-down operation in accordance with the direction of the lens control signal as determined by the address signal generator means.

14. An apparatus according to claim 11 further comprising movement counting means for counting movement of the taking lens and in which the movement counting means comprises an absolute distance counter which effects either an addition or subtraction, in accordance with a detection signal detected by the address signal generator means, of a count detected by said movement counting means.

15. An apparatus according to claim 1 in which the reset means resets the counter means when the taking lens has reached a predetermined position.

16. An apparatus according to claim 15 in which the predetermined position is selected from one of the positions including an infinity position and a nearest point.

17. An apparatus according to claim 15 in which not-in-focus detecting means is provided for generating a not-in-focus signal when an in-focus condition cannot be reached, taking lens control means responsive to said not-in-focus detection means for operating the lens driving means such that the taking lens is subject to a resetting operation in which the taking lens is first moved to its nearest point and is then moved to a reference position located at infinity by said taking lens driving means under control of the taking lens control means.

18. An apparatus according to claim 1 wherein said camera is of the interchangeable lens type, said taking lens including a lens barrel, in which the memory means is mounted on the lens barrel of the camera of interchangeable lens type.

19. An apparatus according to claim 18 in which the memory means comprises lens data storage means which stores absolute distance factors which are related to each particular lens barrel capable of being mounted upon the camera.

20. An apparatus according to claim 1 in which the calculation means performs a calculation according to a formula $$y=b/(x-a)$$

where x represents an absolute distance, y an address number stored in the counter means, and a and b represent absolute distance factors stored as said related data in the memory means.

21. An apparatus according to claim 5 in which the pulse discriminator means determines the direction of movement of the lens drive means in response to a control signal applied to the lens drive means, thereby switching the absolute distance counter between a count-up and a count-down operation or switching it between addition and subtraction, the pulse discriminator means producing a count pulse at least one of the rising and the falling edges of the address signal developed by a lens travel detector in accordance with the control signal.

22. An apparatus according to claim 5 further comprising a lens travel detector for generating first and second address signals which have a phase difference therebetween, the phase difference depending on the direction of movement of the lens drive means, whereby the pulse discriminator means is able to switch the absolute distance up/down counter between a count-up and a count-down operation or between addition and subtraction, the pulse discriminator means producing a count pulse at least one of the rising and the falling edges of the address signal.

23. An apparatus according to claim 5 further comprising braking means and wherein the pulse discriminator means determines an address signal which is produced during the time a signal depending on the direction of movement of the lens drive means is being delivered or during a braking interval of said lens drive means by braking means, inclusive of a motor deenergization interval, which follows the first mentioned interval, as representing the direction of movement of the lens drive means, and delivers it to the absolute distance up/down counter.

24. An apparatus according to claim 1 in which the calculation means calculates the following formula:

$$Y = \frac{b}{x-a} + C$$

where a, b and c represents the specific data, x represents an absolute distance and y represents lens travel.

25. An apparatus according to claim 24 in which the specific data c of a, b and c is zero in the formula.

26. An apparatus according to claim 24 in which the specific data c of a, b and c is zero in the formula.

27. An apparatus for delivering distance information of a camera having a taking lens comprising:
means for calculating information representing an absolute distance and utilizing such information to move the taking lens to a specified position; including:
means for detecting the presence of a low brightness level;
photometric means responsive to said low brightness level detecting means and including means which effects a photometry by automatically providing auxiliary illumination whenever an object being photographed is under a lower brightness level;
said photometry means further including low brightness detecting means for generating an output when the photometry is disabled even during use of said auxiliary illumination means;
means responsive to said low brightness detecting means for moving the taking lens to a predetermined position having a given distance if the photometry is disabled despite the use of the auxiliary illumination;
and means for enabling the photometry to be performed under the auxiliary illumination provided by said auxiliary illumination generating means after the taking lens has been moved to the predetermined position.

28. An apparatus according to claim 27 in which said means for moving the taking lens to the predetermined position includes means for calculating a count in the absolute distance counter which would be present at an absolute distance of xm (where m is the distance measured in meters) according to a formula utilizing absolute distance factors a and b such that $x=b/y+a$, means for comparing such count against a value in the absolute distance counter corresponding to the present position of the taking lens, means for calculating a number of move pulse to a target position as well as a direction of movement of the lens, and means for controlling the taking lens driving means to move the taking lens to a position determined in this manner at which the auxiliary illumination is most effective.

29. An apparatus for delivering distance information of a camera of interchangeable lens type for receiving any one of a plurality of taking lenses comprising:
means for calculating information representing an absolute distance and driving means responsive to such information to move the taking lens to a specified position;
the taking lens having a focal length associated therewith and including storing means, said focal length being stored in storing means;
low contrast detecting means for indicating the presence of a low contrast condition;
means responsive to said low contrast detecting means for reading the focal length of the particular taking lens from the storing means when an object being photographed exhibits a low contrast;
means for calculating a panfocus position which is either a normal focal position of the taking lens or a position where the focusing is most extensive on the basis of the focal length read by the reading means;
means responsive to said means for calculating a panfocus position for operating the lens driving means for moving the taking lens to the calculated position;
and means for enabling a release operation after the taking lens has been moved to the calculated position.

30. An apparatus according to claim 29 further comprising an absolute distance counter, and wherein said means for calculating the panfocus position calculates a count, means for placing the calculated count in absolute distance counter which would prevail at a panfocus position located at an absolute distance and utilizing factors a and b such that $x=b/y+a$ and means to compare such count against the count in the absolute distance counter corresponding to the present position of the taking lens, thereby calculating a number of pulses required to reach a target position and the corresponding direction of movement of the lens.

31. An apparatus for delivering distance information of a camera having a taking lens comprising:
drive means for driving said taking lens;
nearest operating member for a direction to a nearest point for delivering a command signal for driving to the nearest point said drive means for driving the taking lens to move in the direction of the nearest point, said nearest operating member being manually operated by a photographer;
an infinity operating member for a direction of infinity for delivering a command signal for driving to infinity said drive means for driving the taking lens to move in the direction of infinity, said infinity operating member being manually operating by the photographer;

drive control means responsive to a selected on of said operating members for controlling said drive means by receiving the common signal for driving to the nearest point or infinity;

counter means for counting a relative distance in accordance with a movement of the taking lens;

reset means for resetting the counter means when the taking lens has reached a predetermined position;

memory means for storing data which is specific to each particular taking lens and which is used in the conversion of a count in the counter means into an absolute distance; and calculation means for calculating an absolute distance on the basis of the specific data and the count.

32. An apparatus for delivering distance information of a camera comprising:

focus detecting means for delivering distance information of a camera comprising:

focus detecting means for detecting a defocus amount of said taking lens;

an operating member manually operating by a photographer for selectively delivering a drive command signal to a nearest point or infinity;

detecting means for determining an autofocus amount;

drive control means selectively responsive to said detection means and said operating member for controlling said drive means on the basis of the drive command signal in a power focus mode;

counter means for counting a relative distance in response to movement of the taking lens;

reset means for resetting the counter means when the taking lens has reached a predetermined position;

memory means for storing data which is specific to each particular taking lens and which is used in the conversion of a count in the counter means into an absolute distance; and calculation means for calculating an absolute distance on the basis of the specific data and the count.

33. A method for focusing the taking lens of a camera capable of receiving one of a plurality of different taking lenses wherein each taking lens is provided with data relating to said lens for use in determining absolute distance information, said camera further including focus detecting means;

drive means for driving the taking lens;

difference measuring means including photometry means;

calculation means for calculating an absolute distance employing the data from the distance measuring means and the lens data; and release means for operating said camera, said method comprising the step of:

(a) detecting the state of said release means;

(b) reading the lens data when the release means is operated;

(c) operating the distance measuring means for measuring the distance between the camera and the image to be photographed to determine the relative distance value required for moving the lens from its present position to bring the image into focus;

(d) calculating the amount of drive signal required to be applied to the lens drive means to bring the image into focus bases on the distance data obtained at step (c) and the lens data;

(e) comparing the relative distance calculated at step (c) with a predetermined threshold; and providing an in focus condition when the relative distance value is less than the predetermined threshold value.

34. The method of claim 33 further comprising steps of:

(f) storing the data representing the signal to be applied to the lens drive means when the displacement distance is greater than said predetermined threshold;

(g) driving said lens drive means by said signal value; and returining to step (c).

35. The method of claim 34 further comprising the steps of:

(h) keeping a count of each time the motor drive means is operated; and (i) terminating the lens focusing operation when said count reaches a predetermined number.

36. The method of claim 35 wherein the step of storing the signal to be applied to the lens drive means further comprises the step of comparing the presently shaped value with the previously stored value; and terminating the lens focusing operation when the present value exceeds the previous value.

37. The method claim 33 further comprising the step of:

(f) operating the lens drive means to move the lens to the infinity position and thereafter to the near distance position when an indication that the lens focusing operation is incapable of obtaining a focus condition.

38. The method claim 33 further comprising the step of:

(f) operating the lens drive means to move the taking lens in a first direction and then in a second direction opposite said first direction when an indication is provided that the lens focusing operation is incapable of obtaining a focus condition.

39. The method of claim 33 wherein said camera further comprises an absolute distance counter and said method further comprises the steps of:

(f) loading the number of drive pulses measured from the infinity position to the present position of the lens and which have been calculated at step (d) in said absolute magnitude of the distance to (g) calculating the absolute distance counter; and an object being photographed based on the count in said absolute distance counter.

40. The method of claim 33 wherein said camera comprises auxiliary illumination means and said method further comprises the steps of:

(f) energizing the auxiliary illumination means when the photometry means indicates a low brightness level and performing steps (c) through (e).

41. The method of claim 40 further comprising the step of:

(g) halting the lens focusing operation when insufficient brightness is detected after said auxiliary illumination has been provided.

42. The method of claim 41 further comprising the steps of:

(h) energizing the auxiliary illumination means;

(i) obtaining said lens data;

(j) determining the distance required to move the lens to bring the image into focus;

(k) employing the distance calculated in step (j) and the lens data for determining the amount of drive signal necessary to drive the lens driving means for bringing the image into focus;

(l) comparing the displacement value determined at step (j) and driving the lens driving means according to the signal obtained during step (k) when the displacement signal is greater than a predetermined threshold level.

43. The method of claim 42 further comprising the step of:

(m) preventing movement of the lens when the value determined at step (j) is greater than a second predetermined threshold which is greater than said first mentioned threshold.

44. The method of claim 42 wherein the camera includes an absolute distance counter and further comprising the step of:

(m) loading into the counter the number of drive pulses representing the absolute distance which the lens is driven referenced to the infinity position.

45. The method of claim 33 wherein the calculation for determining the absolute distance signal used in step (d) is in accordance with the formula $y=b/x-a$ wherein a and b are constants, x is the distance calculated in step (e) and y is the distance required to move the lens to obtain a focus condition.

46. The method of claim 33 wherein said camera further comprises a counter and means for detecting operation of the lens drive means to generate representative count pulses, said method further comprising the steps of:

(f) accumulating a count in the counter responsive to the number of count pulses generated by said detecting means and the direction of movement of the lens drive means to thereby provide an absolute count of the movement of the lens with reference to the infinity position.

47. The method of claim 42 further comprising the step of:

(m) storing the absolute distance value in a counter.

48. The method of claim 42 further comprising the steps of:

(m) comparing the relative distance against the predetermined threshold; and providing an indication of the inability to reach a focus condition when the differential distance is greater than a predetermined multiple of said predetermined threshold.

49. The method of claim 48 further including the step of:

(n) providing an indication of the inability to obtain an in-focus condtion when the present displacement distance is greater than the previously determined displacement distance.

50. The method of claim 49 further comprising the steps of:

(o) driving the lens driving means according to the absolute value calculated during step (j) so long as the present displacement distance is not greater than said predetermined multiple of said predetermined threshold and said present displacement distance is not greater than the previously calculated displacement distance; and repeating method steps (i) through (j).

51. The method of claim 33 wherein said camera includes low contrast measuring means and further comprises the steps of:

(f) determining from said lens data the position where focusing is most extensive for the focal length of the lens;

(g) moving the lens to said position; and (h) repeating steps (c) through (e).

52. The method of claim 33 wherein said camera includes low brightness measuring means and further comprises the steps of:

(f) obtaining an absolute range value from the lens data;

(g) moving the lens according to the value calculated in step (f); and (h) repeating steps (c) through (e).

53. A method for adjusting the focusing of a camera capable of receiving one of a plurality of different lenses wherein each lens is provided with data relating to said lens for use in determining absolute distance information, said camera further including focus detecting means;

drive means for driving the taking lens;

counter means;

calculation means for calculating an absolute distance on the basis of the output of the focus detecting means and the lens data; and release means for operating said camera, said method comprising the steps of:

(a) detecting the state of said release button;

(b) reading the lens data when the release button is operated;

(c) operating the focus detection means to measure the distance between the camera and the image and determining the distance required for moving the lens to bring the image into focus;

(d) calculating the drive signal required to be implied to the lens drive means to bring the image into focus based on the data obtained at steps (b) and (c);

(e) comparing the relative distance calculated at step (d) with a predetermined threshold value; and (f) providing an in focus condition when the relative distance value is less then the predetermined threshold value.

54. The method of claim 53 where the camera further includes photometry means said method further comprising the steps of:

(g) providing a low brightness indication when photometry means so indicates;

(h) moving the lens to a position having the greatest probability of obtaining a relative distance calculation when the brightness level is low;

(i) repeating steps (c) through (f).

* * * * *

UNITED STATES PATENT AND TRADEMARK OFFICE
CERTIFICATE OF CORRECTION

PATENT NO. : 4,743,931

DATED : May 10, 1988

INVENTOR(S) : Minoru Matsuzaki; Youji Watanabe; Junichi Itoh;
Masato Miyazawa; and Toru Komatsu It is certified that error appears in the above-identified patent and that said Letters Patent is hereby corrected as shown below:

IN THE SPECIFICATION:

Column 3, line 38, change "countier" to --counter--.

Column 5, line 18, change "a" to --the--.

lines 21-22, change "conveter" to --converter--.

line 68, change "noises" to --noise--.

Column 7, line 47, change "sebsequent" to --subsequent--.

Column 10, line 2, after "selected," insert --the--.

line 20, delete "a" (first occurrence).

UNITED STATES PATENT AND TRADEMARK OFFICE
CERTIFICATE OF CORRECTION

PATENT NO. : 4,743,931

DATED : May 10, 1988

INVENTOR(S) : Minoru Matsuzaki; Youji Watanabe; Junichi Itoh; Masato Miyazawa; and Toru Komatsu It is certified that error appears in the above-identified patent and that said Letters Patent is hereby corrected as shown below:

Column 12, line 11, change "Infinity" to --infinity--.

line 42, change "O" to --Ⓕ--.

Column 14, line 15, delete "the".

line 46, after "photographed" insert --by--.

Column 15, line 17, change "incldes" to --includes--.

Column 16, line 35 change "noises." to --noise.--.

Column 20, line 34, "The" should read --Subsequently, the--.

Column 27, lines 6, 7 & 8, delete "In addition,.... fixed lens camera.".

UNITED STATES PATENT AND TRADEMARK OFFICE
CERTIFICATE OF CORRECTION

PATENT NO. : 4,743,931

DATED : May 10, 1988

INVENTOR(S) : Minoru Matsuzaki; Youji Watanabe; Junichi Itoh; Masato Miyazawa; and Toru Komatsu It is certified that error appears in the above-identified patent and that said Letters Patent is hereby corrected as shown below:

Column 28, line 42, before "absolute" insert --an--.

Column 34, line 22 change "shaped" to --stored--.

Signed and Sealed this

Fourteenth Day of November, 1989

Attest:

JEFFREY M. SAMUELS

*Attesting Officer*     *Acting Commissioner of Patents and Trademarks*